(12) United States Patent
Muto

(10) Patent No.: US 8,060,928 B2
(45) Date of Patent: Nov. 15, 2011

(54) INFORMATION-PROCESSING APPARATUS, METHOD FOR CONTROLLING INFORMATION-PROCESSING APPARATUS, AND STORAGE MEDIUM

(75) Inventor: Tsuyoshi Muto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 714 days.

(21) Appl. No.: 12/100,280

(22) Filed: Apr. 9, 2008

(65) Prior Publication Data

US 2008/0263655 A1 Oct. 23, 2008

(30) Foreign Application Priority Data

Apr. 11, 2007 (JP) ................. 2007-103854

(51) Int. Cl.
  G06F 7/04 (2006.01)
  G06F 12/00 (2006.01)
  G06F 12/14 (2006.01)
  G06F 13/00 (2006.01)
  G06F 17/30 (2006.01)
  G11C 7/00 (2006.01)
  G06F 15/16 (2006.01)
  G06F 3/12 (2006.01)
(52) U.S. Cl. .......... 726/16; 358/1.15; 709/217; 709/219
(58) Field of Classification Search .................. None
  See application file for complete search history.

(56) References Cited

U.S. PATENT DOCUMENTS

2004/0019687 A1 1/2004 Ozawa et al.
2005/0231760 A1* 10/2005 Minato ............... 358/1.15

FOREIGN PATENT DOCUMENTS

JP 2005301601 A 10/2005
WO 2005/093542 A 10/2005

OTHER PUBLICATIONS

European Patent Office, European Search Report, Jan. 21, 2009.

* cited by examiner

*Primary Examiner* — Shin-Hon Chen
(74) *Attorney, Agent, or Firm* — Canon USA, Inc., I.P. Division

(57) ABSTRACT

The present invention can control a logout procedure of each user according to an operation state and provides an information-processing apparatus with enhanced security and excellent usability. A method for controlling an information-processing apparatus capable of maintaining a state in which a plurality of users has been logged in to the information-processing apparatus comprises causing a display unit to switch an operation screen for a user who currently logs in to the information-processing apparatus between an active state and an inactive state where the user can or cannot operate the screen respectively; automatically logging out the user of the information-processing apparatus when a predetermined time has elapsed; and controlling so as not to automatically log out a user whose operation screen is in the inactive state of the information-processing apparatus when the predetermined time has elapsed.

7 Claims, 20 Drawing Sheets

FIG.5

| USER ID (501) | USER NAME (502) | PASSWORD (503) | LOGIN STATE (504) | DISPLAY STATE OF OPERATION SCREEN (505) |
|---|---|---|---|---|
| 0001 | SYSTEM | ******** | 0 | LOGOUT STATE |
| 0002 | GUEST | ******** | 0 | LOGOUT STATE |
| 0003 | USER 1 | ******** | 0 | LOGOUT STATE |
| 0004 | USER 2 | ******** | 1 | INACTIVE STATE |
| 0005 | USER 3 | ******** | 0 | LOGOUT STATE |
| 0006 | USER 4 | ******** | 1 | ACTIVE STATE |
| 0007 | USER 5 | ******** | 0 | LOGOUT STATE |
| 0008 | USER 6 | ******** | 1 | INACTIVE STATE |
| ⋮ | | | | ⋮ |
| | | | | |

500

| USER ID (601) | USER NAME (602) | LOGIN TIME (603) | LOGOUT REFERENCE TIME (604) | LOGOUT TRANSITION TIME (605) |
|---|---|---|---|---|
| 0001 | SYSTEM | | | NOT SET |
| 0002 | GUEST | | | 10 MIN. |
| 0003 | USER 1 | 14:15:15 | 14:23:25 | 15 MIN. |
| 0004 | USER 2 | 14:17:45 | 14:20:50 | 8 MIN. |
| 0005 | USER 3 | | | 5 MIN. |
| 0006 | USER 4 | 14:12:15 | 14:22:00 | 25 MIN. |
| 0007 | USER 5 | | | NOT SET |
| 0008 | USER 6 | 14:10:30 | 14:12:31 | 15 MIN. |
| ⋮ | | | | |
| | | | | |

| DIRECTORY INFORMATION |
| --- |
| PROGRAM CODE CORRESPONDING TO STEPS IN FLOWCHART ILLUSTRATED IN FIG. 10 |
| PROGRAM CODE CORRESPONDING TO STEPS IN FLOWCHART ILLUSTRATED IN FIG. 16 |
| PROGRAM CODE CORRESPONDING TO STEPS IN FLOWCHART ILLUSTRATED IN FIG. 18 |
| PROGRAM CODE CORRESPONDING TO STEPS IN FLOWCHART ILLUSTRATED IN FIG. 19 |
| |

INFORMATION-PROCESSING APPARATUS, METHOD FOR CONTROLLING INFORMATION-PROCESSING APPARATUS, AND STORAGE MEDIUM

BACKGROUND OF THE INVENTION

1. Field of the Invention

The present invention relates to an information-processing apparatus, a method for controlling the information-processing apparatus, and a storage medium.

2. Description of the Related Art

To enhance security, a conventional information-processing apparatus (e.g., image-forming apparatus) requests a user to enter a user identification (ID) and a password in a log-in procedure and permits only a successfully authenticated user to operate the information-processing apparatus.

As discussed in Japanese Patent Application Laid-Open No. 2005-301601, there is a conventional information-processing apparatus that can accept a login request from another user who wants to operate the information-processing apparatus while maintaining a log-in state of a user who currently logs in the information-processing apparatus. This conventional information-processing apparatus stores information relating to an operation screen for each user and displays an operation screen based on a user's instruction. Thus, each user can operate the operation screen to input various settings and instructions.

However, this kind of information-processing apparatus cannot allow a plurality of users to simultaneously input instructions and therefore controls a display unit to display only one active operation screen that a user can operate.

While the information-processing apparatus allows a designated user to operate an active operation screen, the information-processing apparatus maintains a login state of other user(s) whose operation screen is in an inactive state. Furthermore, to enhance security, the information-processing apparatus forces a user operating an inactive operation screen to automatically log out of the information-processing apparatus after a predetermined time has elapsed.

The above-described conventional method forcibly starts a logout procedure as for the user whose operation screen is in an inactive state after a predetermined time has elapsed. Therefore, the conventional method has the following problems.

For example, a user who currently operates an active operation screen may allow another user to temporarily operate the information-processing apparatus. In this case, the information-processing apparatus accepts a login procedure of another user and causes the display unit to display an active operation screen for another user. In this case, the information-processing apparatus switches the operation screen corresponding to the former user into an inactive state and, if a predetermined time has elapsed, forcibly starts a logout procedure for the former user even when the user wants to operate the information-processing apparatus.

SUMMARY OF THE INVENTION

Exemplary embodiments of the present invention are directed to an information-processing apparatus and a method for controlling an information-processing apparatus which can overcome the above-described problems.

The present invention can control a logout procedure for each user according to an operation state and provides an information-processing apparatus which is enhanced in security and excellent in usability.

According to an aspect of the present invention, an information-processing apparatus which is capable of maintaining a login state of each user when the information-processing apparatus is operated by a plurality of users includes a display control unit configured to cause a display unit to switch an operation screen for a user who currently logs in the information-processing apparatus between an active state where the user can operate the operation screen and an inactive state where the user cannot operate the operation screen, and a control unit configured to automatically start a logout procedure for the user who currently logs in the information-processing apparatus after a predetermined idle time has elapsed. If the display unit displays an active operation screen for a first user and displays an inactive operation screen for a second user, the control unit prevents the second user whose operation screen is in an inactive state from being automatically logged out of the information-processing apparatus after the predetermined idle time has elapsed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 5 illustrates an example user management table according to an exemplary embodiment of the present invention.

FIG. 20 illustrates example program codes according to an exemplary embodiment of the present invention.

DETAILED DESCRIPTION OF THE EMBODIMENTS

Figure 1:
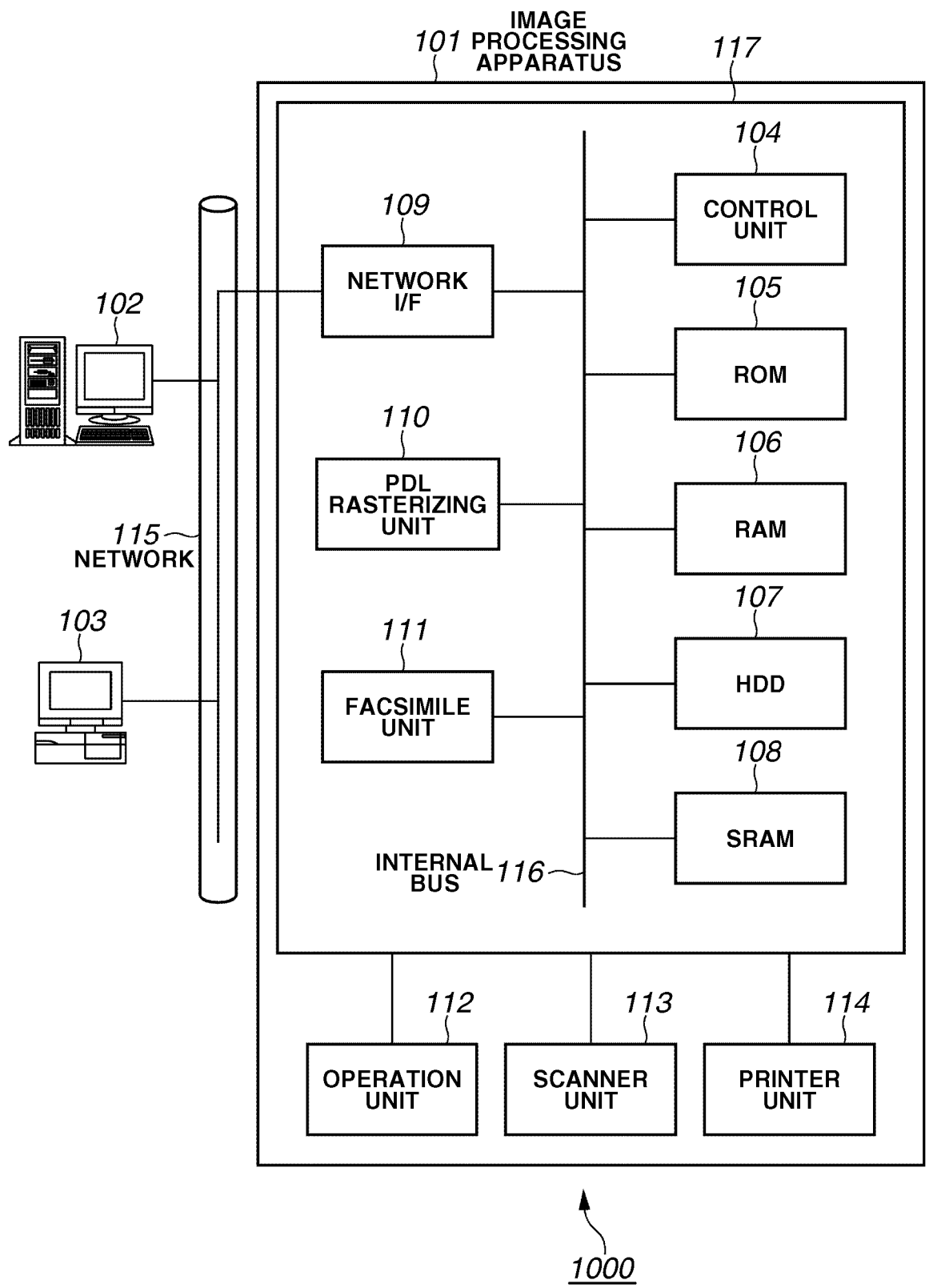
FIG. 1 illustrates a system configuration of an image-processing system according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 illustrates a system configuration of an image-processing system according to a first exemplary embodiment of the present invention.

An example information-processing system according to the first exemplary embodiment is a printing system. An example information-processing apparatus according to the first exemplary embodiment executes a job including image data. A printing system 1000 illustrated in FIG. 1 includes an image-processing apparatus 101, a server computer 102, and a client computer 103 which can communicate with each other via a network 115.

A control unit 104 performs various controls according to program(s) stored in a read only memory (ROM) 105.

The ROM 105 stores the program(s) that the control unit 104 can execute. For example, the ROM 105 stores a system startup program, a print program that causes a printer unit 114 to execute print processing, and a display control program that controls display of a screen. Furthermore, the ROM 105 stores program(s) that enable the control unit 104 to perform various controls according to flowcharts illustrated in FIGS. 10, 16, 18, and 19.

A random access memory (RAM) 106 functions as a work area and a buffer for the control unit 104. For example, the RAM 106 stores programs such as an application program loaded from the ROM 105 by the control unit 104. Furthermore, the RAM 106 stores image data to display a screen.

A hard disk drive (HDD) 107 stores image data. For example, the HDD 107 stores image data read via a scanner unit 113 or image data received from an external device via a network interface (network I/F) 109. Furthermore, the HDD 107 stores user ID and a password of each user that the control unit 104 can refer to as information for authentication of the user. Moreover, the HDD 107 stores screen setting information associated with user ID, so that an operation screen dedicated to each user can be displayed when the user logs in the image-processing apparatus 101. The HDD 107 is described later in more detail with reference to FIG. 4.

A static random access memory (SRAM) 108, having a dedicated power source, can store memorized data even if a power source of the image-processing apparatus 101 is turned off. The network I/F 109 is an interface controller that enables the image-processing apparatus 101 to communicate with an external apparatus such as the server computer 102 and the client computer 103.

A page description language (PDL) rasterizing unit 110 can rasterize PDL data into image data.

A facsimile unit 111 expands compressed image data received via a telephone line and transfers the expanded image data to the HDD 107. Furthermore, the facsimile unit 111 compresses image data transferred from the HDD 107 and transmits the compressed image data via the telephone line.

An operation unit 112, including a keyboard equipped with a plurality of hard keys, a touch panel, a liquid crystal display (LCD) and light emitting diodes (LEDs), enables a user to perform various operations and input instructions. The control unit 104 performs various controls according to instructions entered by a user via the operation unit 112. The control unit 104 can cause the touch panel of the operation unit 112 to display print status or notify a user of warning. The operation unit 112 is described later in more detail with reference to FIG. 3.

The scanner unit 113 reads an original in response to a user's instruction input via the control unit 104 and converts the read original image into image data. The control unit 104 causes the printer unit 114 to print the converted image data on a recording paper. The control unit 104 causes the HDD 107 to store the converted image data.

An internal bus 116 connects the above-described components that perform transmission/reception of data in the image-processing apparatus 101. The image-processing apparatus 101 receives various settings relating to a copy function, a facsimile function, a data transmission function, and a box function from a user via an operation screen 1300 illustrated in FIG. 13. The image-processing apparatus 101 executes the functions based on the received settings.

Figure 2:
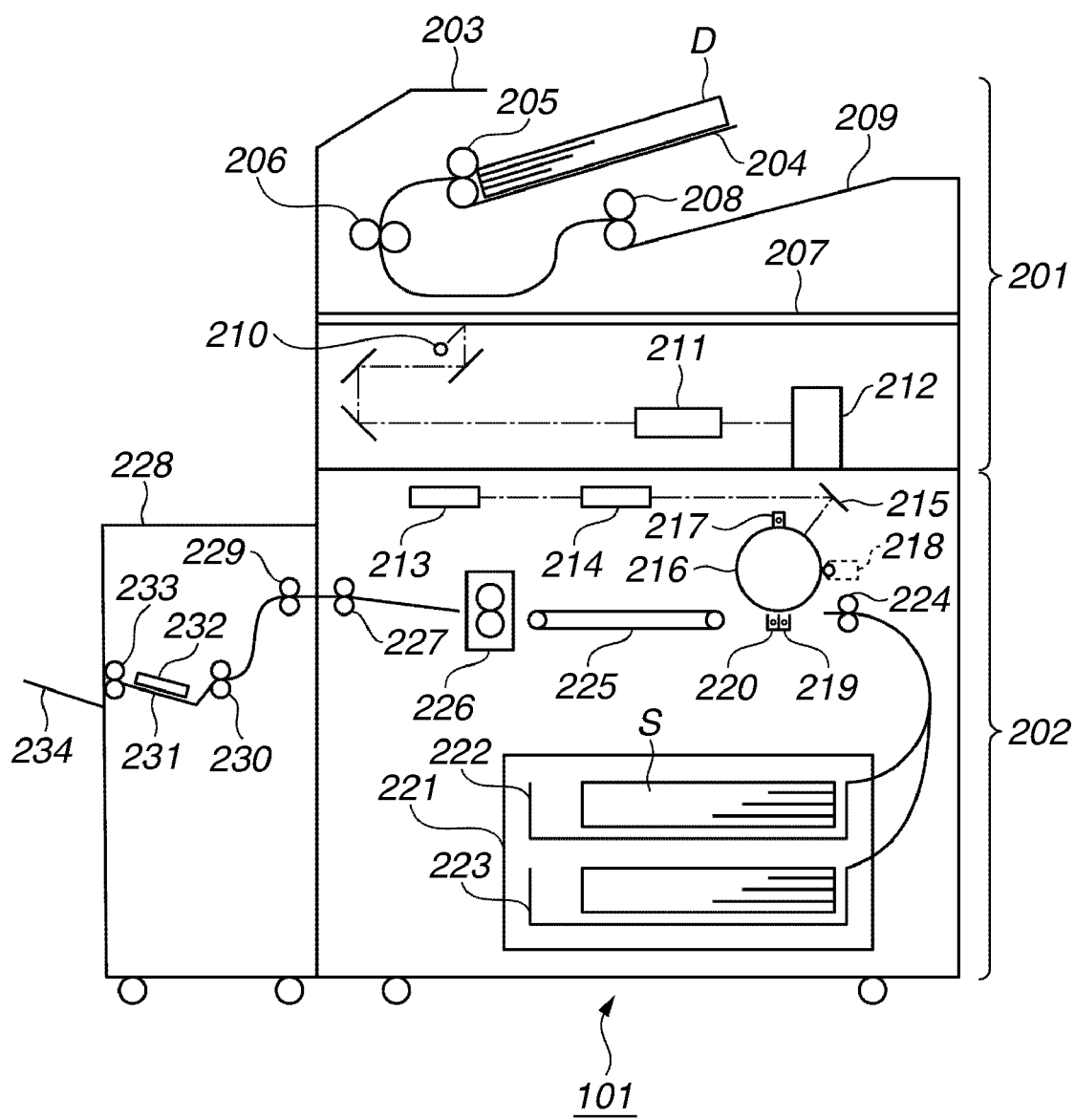
FIG. 2 illustrates a hardware configuration of an image-processing apparatus according to an exemplary embodiment of the present invention.

FIG. 2 illustrates a cross-sectional view of an example image-processing apparatus. The example illustrated in FIG. 2 is the image-processing apparatus 101 illustrated in FIG. 1. However, the configuration of the image-processing apparatus 101 is not limited to the example illustrated in FIG. 2.

The image-processing apparatus 101 illustrated in FIG. 2 includes an original reading unit 201 and a printing unit 202. If a user instructs start of scanning or copying via the operation unit 112, the control unit 104 receives the instruction and causes the original reading unit 201 to read an image of the original.

In accordance with an instruction to start image reading, sheets of the original D placed on a document feeding tray 204 of a document feeding unit 203 are picked up one by one by a pair of separation rollers 205 and successively conveyed onto a platen glass 207 by a pair of conveyance rollers 206. The conveyed sheet of the original D passes the platen glass 207 and is then discharged to a discharge tray 209 by a pair of discharge rollers 208.

A light source 210 emits light toward the original D passing along the platen glass 207. Reflection light from the original D is read as image data by a charge coupled device (CCD) image sensor 212 via a lens unit 211. The image data read by the CCD image sensor 212 is once transferred to the control unit 104 and stored in the HDD 107.

In the printer unit 114, a laser output unit 213 receives image data from the HDD 107 and outputs a laser beam based on the received image data. The output laser beam passes through an image-forming lens unit 214 and reflects on a mirror 215 to concentrate and form an image on a photosensitive drum 216.

The photosensitive drum 216 is charged beforehand by a primary charging unit 217, so that the reflection light from the mirror 215 forms an electrostatic latent image on the photosensitive drum 216. A developing unit 218 converts the electrostatic latent image into a toner image.

A pair of resist rollers 224 corrects a skew of a sheet S supplied from a paper feeding unit 221 and sends the sheet S to an image forming unit at predetermined timing. In the image forming unit, a transfer charging unit 219 transfers the toner image from the photosensitive drum 216 onto the sheet S. A separation charging unit 220 separates, from the photosensitive drum 216, the sheet S together with the toner image transferred thereon.

The separated sheet S is conveyed by a conveyor 225 to a fixing unit 226. The fixing unit 226 applies heat and pressure to the sheet S so that the toner image can be permanently fixed. Then, the sheet S on which the image is fixed is conveyed by a pair of discharge rollers 227 into a sheet processing unit 228.

In the sheet processing unit 228, the sheet S is conveyed by a plurality of conveyance rollers 229 and 230 to a processing tray 231. An alignment member 232 forms a sheet stack of a plurality of sheets successively conveyed to the processing tray 231. If necessary, a staple unit (not illustrated) can perform staple processing on the aligned sheet stack according to a user's designation. Then, the sheet stack is discharged by a pair of stack discharge rollers 233 to a loading tray 234.

A print product of the original D is accomplished through the above-described processing. The image-processing apparatus 101 repeats the above-described operation until the number of print products reaches a value required by a user.

Figure 3:
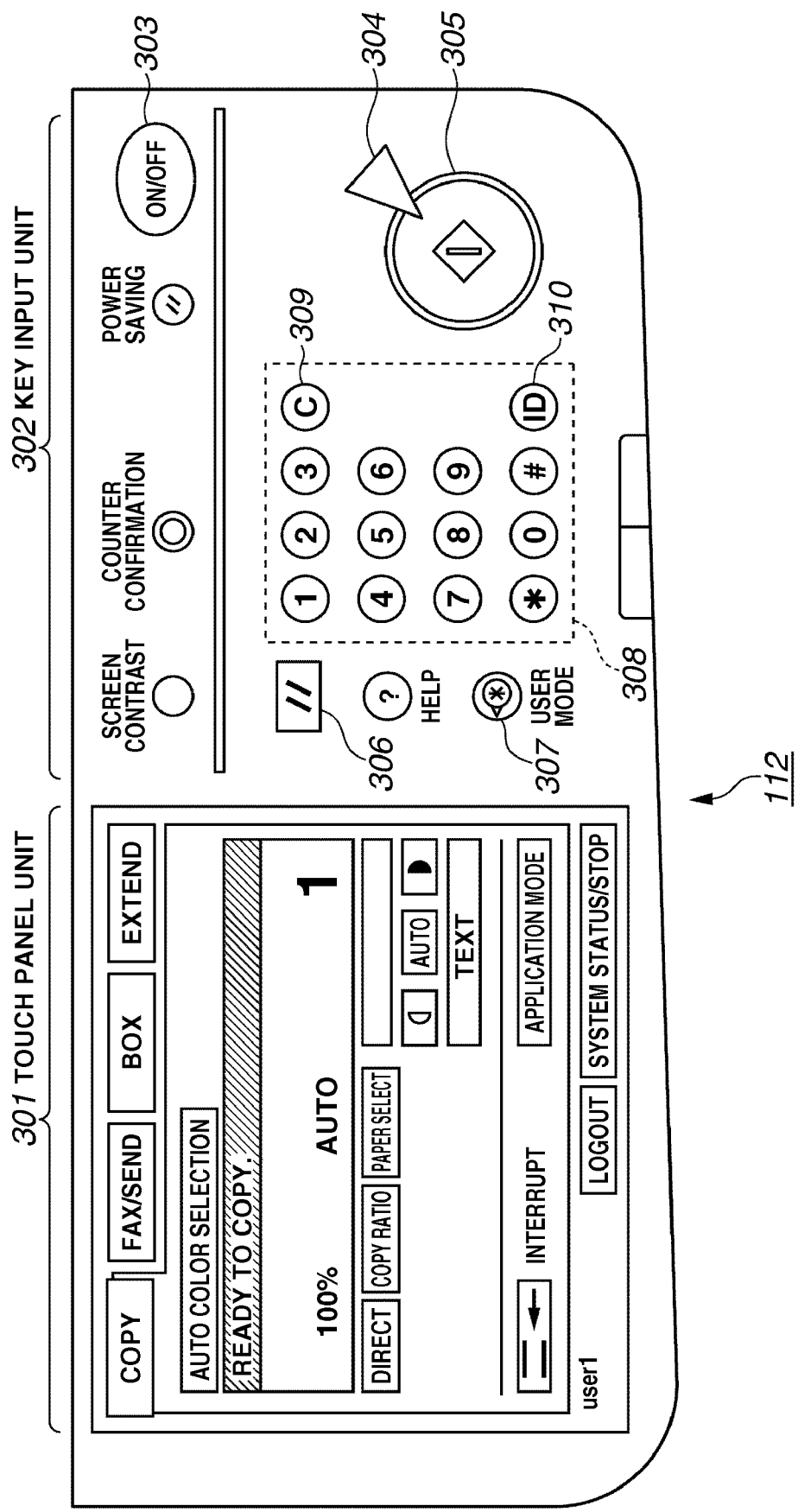
FIG. 3 illustrates a user operation unit of an image-processing apparatus according to an exemplary embodiment of the present invention.

FIG. 3 illustrates an example configuration of the operation unit 112 equipped in the above-described image-processing apparatus 101.

The operation unit 112 includes a key input unit 302 that accepts a user's operations input via hard keys and a touch panel unit 301 that accepts user's operations input via soft keys (display keys). The key input unit 302 includes an operation unit power switch 303 that turns on and off power of the operation unit 112.

A start key 305 is a key that enables a user to instruct the control unit 104 of the image-processing apparatus 101 to execute a print job including, for example, a reading operation of the original by the scanner unit 113 and print processing applied to the read image of the original. Furthermore, the start key 305 is a key that enables a user to instruct the control unit 104 of the image-processing apparatus 101 to execute a data transmission job including transmission of image data stored in the HDD 107 to an external device via the network I/F 109.

A stop key 304 is a key that enables a user to stop the processing of an accepted print job. A numeric keypad 308 includes ten keys that enable a user to set the number of print products, input a password, and so on. A clear key 309 is a key that enables a user to delete an input value (e.g., user ID and password) having been input via the numeric keypad 308.

A reset key 306 is a key that enables a user to invalidate various settings set by a user and restore default setting values. A user mode key 307 is a key that enables a user to display a dedicated system setting screen on the touch panel unit 301.

An identification (ID) key 310 is a key that enables a user to log in the image-processing apparatus 101. If a user presses the ID key 310, the control unit 104 causes the touch panel unit 301 to display a password input screen. Then, the control unit 104 performs user authentication based on a user ID and a password input via the password input screen. If the user is successfully authenticated, the control unit 104 permits the authenticated user to log in the image-processing apparatus 101 and causes the touch panel unit 301 to display an operation screen dedicated to the user.

The touch panel unit 301 includes a liquid crystal display (LCD) and a touch panel display including transparent electrodes adhering thereto. The touch panel unit 301 has functions to accept various settings entered from a user and indicate information to the user. For example, if the touch panel unit 301 detects that a user presses a display key displayed on the LCD, the control unit 104 executes processing corresponding to the display key. Example screens displayed on the touch panel unit 301 are described later. In the following description, the touch panel unit 301 may be referred to as a display unit 301.

Figure 4:
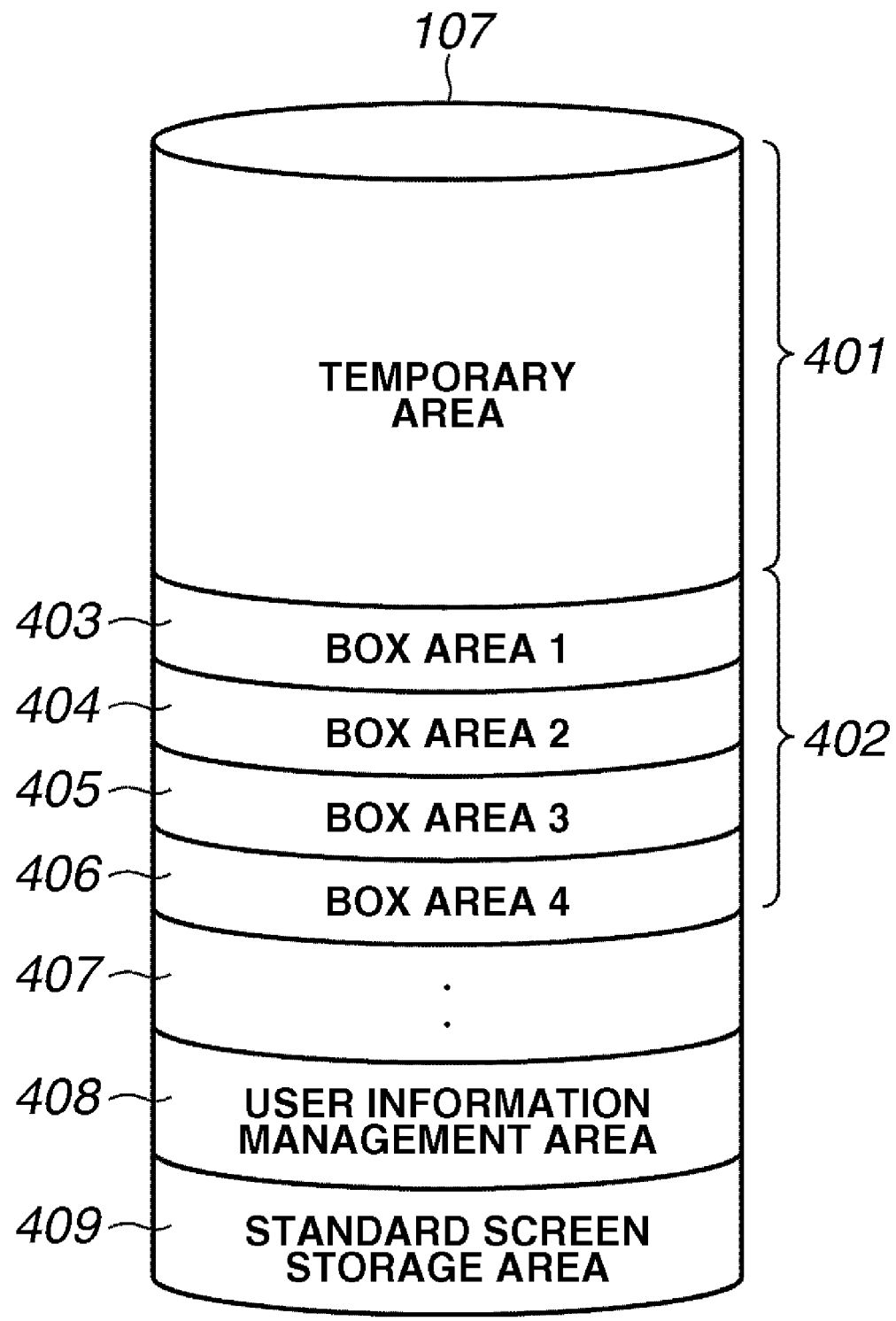
FIG. 4 illustrates a hard disk drive (HDD) configuration of an image-processing apparatus according to an exemplary embodiment of the present invention.

FIG. 4 illustrates an example configuration of the HDD 107 of the above-described image-processing apparatus 101 according to the first exemplary embodiment. The HDD 107 includes a temporary area 401, a box area 402, a user information management area 408, and a standard screen storage area 409.

The temporary area 401 is a storage area where the control unit 104 can temporarily store data. For example, the control unit 104 receives image data together with a print instruction from the client computer 103 and stores the received image data in the temporary area 401. Furthermore, the control unit 104 rasterizes image data to print and temporarily stores the rasterized data in the temporary area 401.

The box area 402 includes a plurality of storage areas (e.g., box area 1, box area 2, box area 3, - - -) which can be used for the box function. The control unit 104 stores image data in each box area based on a user's instruction. Later, the control unit 104 performs printing of image data stored in each box area and transmission of the image data to an external device according to an instruction from a user.

Furthermore, a user can set an individual password to each box area. If a user designates a box area to which any password is set and refers to image data stored in the box area, the control unit 104 requests the user to input the password set to the designated box area. The control unit 104 authenticates the input password. If the user is successfully authenticated, the control unit 104 causes the touch panel unit 301 to display a list of image data stored in the designated box area. Then, if a user selects image data from the list and instructs print processing of the selected image data, the control unit 104 causes the printer unit 114 to perform print processing of the selected image data.

The user information management area 408 is an area to store information of each user, such as authentication information, state information, and usage authority for the image-processing apparatus 101. For example, the control unit 104 stores user authentication information (e.g., user ID and password) and state information (e.g., a login state of the image-processing apparatus 101) of each user in the user information management area 408 as a form of a user management table 500 illustrated in FIG. 5. Furthermore, the control unit 104 can use a state transition management table 600 illustrated in FIG. 6 to store user's login time and various setting information for the image-processing apparatus 101.

In the above-described image-processing apparatus 101, the control unit 104 performs the following controls.

The image-processing apparatus 101 according to the first exemplary embodiment requests a user of the image-processing apparatus 101 to input a user ID and a password. Then, the control unit 104 performs user authentication based on the input user ID and the password. Then, the control unit 104 permits a user, if successfully authenticated, to operate the image-processing apparatus 101. Furthermore, in the image-processing apparatus 101 according to the first exemplary embodiment, the control unit 104 allows a user to log in the image-processing apparatus 101 while maintaining a login state of another user. Namely, the control unit 104 allows a plurality of users to simultaneously log in the image-processing apparatus 101.

Furthermore, the HDD 107 stores information of a plurality of users who have registered a user ID and a password. The control unit 104 performs a control based on the stored information. More specifically, the control unit 104 manages user name, password, and user state information per user by the above-described user management table 500. For example, the control unit 104 can manage the state of an operation screen for each user by using a "state" field 505 in the user management table 500. The following is three states of the operation screen that the control unit 104 can manage for each user based on the user management table 500.

State 1: Active State

The active state is a state where the touch panel unit 301 displays an operation screen for a user who currently logs in the image-processing apparatus 101 and allows the user to operate the screen. If the operation screen is in an active state, a user can instruct setting of processing or execution of a job relating to the copy function, the data transmission function, and the box function to the image-processing apparatus 101 via the operation screen. For example, if an operation screen of user A is in an active state, the control unit 104 causes the touch panel unit 301 to fully display the operation screen 1300 illustrated in FIG. 13. If the user A inputs job settings and a job execution request via the operation screen, the control unit 104 executes the processing as a job of the user A and stores executed job information as history information of the user A.

State 2: Inactive State

The inactive state is a state where the touch panel unit 301 does not display an operation screen which a user who currently logs in the image-processing apparatus 101 can operate. If the operation screen is in an inactive state, a user cannot request setting of processing or execution of a job relating to the copy function, the data transmission function, and the box function to the image-processing apparatus 101 via the operation unit 112. In this case, the user can instruct to switch the operation screen from an inactive state to an active state and input job settings and a job execution request via the active operation screen.

State 3: Logout State

The logout state is a state where a user does not log in the image-processing apparatus 101. In the logout state, the touch panel unit 301 does not display an operation screen for a user. A user cannot request setting of processing or execution of a job relating to the copy function, the data transmission function, and the box function to the image-processing apparatus 101.

The above-described "state 1" and "state 2" can be referred to as "login state" where a user currently logs in the image-processing apparatus 101.

The control unit 104 stores "state 1" to "state 3" in association with a user ID registered beforehand in the user management table 500 illustrated in FIG. 5. Then, if there is any transition in the state of a user, the control unit 104 rewrites information in the "state" field 505 of the user management table 500. In this manner, the control unit 104 updates the user state information in response to a transition of the user state and can identify a state of each user that belongs to any one of "state 1" to "state 3" by referring to the user management table.

The user management table 500 illustrated in FIG. 5 includes a "login state" field 504 that indicates "1" if a user currently logs in the image-processing apparatus 101 and "0" if a user does not log in the image-processing apparatus 101. As described above, the control unit 104 can use the user management table 500 to manage the state of each user.

Figure 6:
FIG. 6 illustrates an example transition state management table according to an exemplary embodiment of the present invention.

Furthermore, the control unit 104 uses the state transition management table 600 illustrated in FIG. 6 to control a switching of the user state.

A "login time" field 603 is a field of time data recorded when a user has logged in the image-processing apparatus 101. If a user logs in the image-processing apparatus 101, the control unit 104 stores time data in the "login time" field 603 associated with user ID.

A "logout reference time" field 604 is a field of logout reference time (i.e., time data representing a start point of time measurement for making a user log out). The control unit 104 permits a user to log out of the image-processing apparatus 101 if logout transition time recorded in a "logout transition time" field 605 has elapsed from the logout reference time set for the user.

The logout reference time can be updated in response to a last operation input by a user via the operation unit 112 when the operation screen for the user is displayed in an active state. For example, if a user presses a key of an operation screen displayed on the touch panel unit 301 or a key on the key input unit 302 when the operation screen for the user is in an active state, the control unit 104 updates the time data recorded in the "logout reference time" field 604. Furthermore, the control unit 104 can set or update the logout reference time in response to a switching of the operation screen of a user between an active state and an inactive state.

The "logout transition time" field 605 is a field that records time from the logout reference time set for a user who currently logs in the image-processing apparatus 101 to when the control unit 104 permits the user to automatically log out.

If the control unit 104 determines that a user in a login state is present, the control unit 104 determines whether the time set in the "logout transition time" field 605 has elapsed after the logout reference time for each user in a login state. Then, if the time set in the "logout transition time" field 605 has elapsed after the logout reference time, the control unit 104 permits the user to log out of the image-processing apparatus 101.

The logout reference time (i.e., start timing for measuring the logout transition time) can be updated in response to a user's operation. Namely, the control unit 104 controls to start a logout procedure for a user currently logged in the image-processing apparatus 101 if the set time (i.e., logout transition time) has elapsed in an idle state where the user does not perform any operation. The control unit 104 executes this control regardless of the state (active or inactive) of the operation screen of the user.

Figure 7:
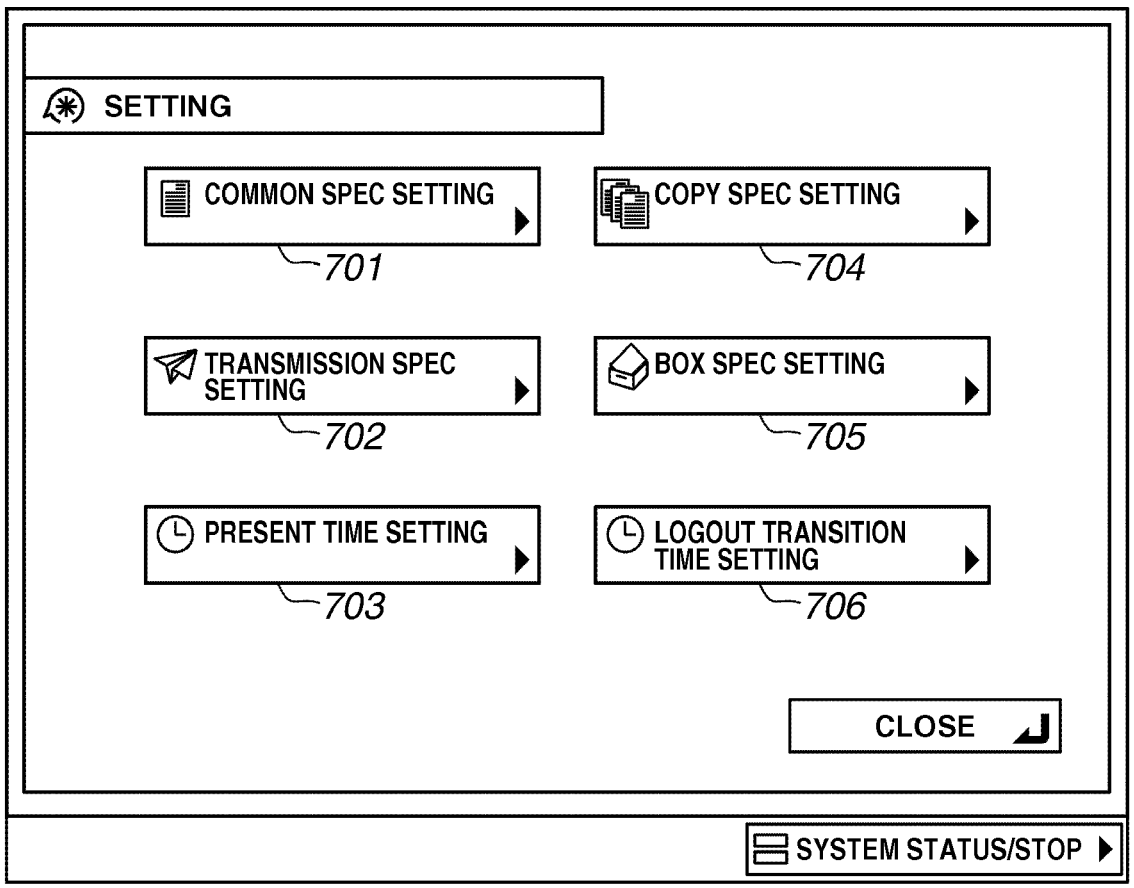
FIG. 7 illustrates an example display screen that a touch panel unit can display according to an exemplary embodiment of the present invention.
Figure 8:
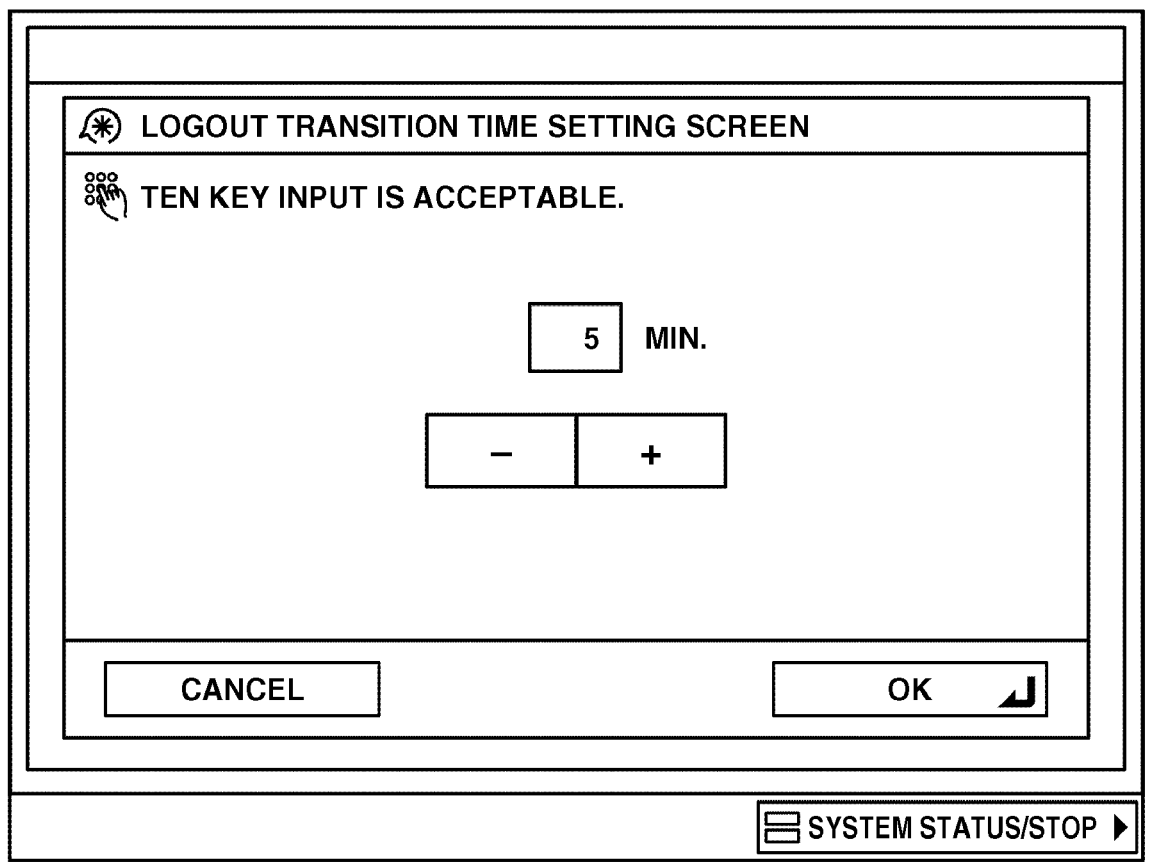
FIG. 8 illustrates an example display screen that the touch panel unit can display according to an exemplary embodiment of the present invention.

A value in the "logout transition time" field 605 can be set from an example screen illustrated in FIG. 8. For example, if the control unit 104 detects that a user corresponding to an operation screen displayed in an active state presses the user mode key 307, the control unit 104 causes the touch panel unit 301 to display a setting item selection screen 700 for the user as illustrated in FIG. 7.

If a user presses a logout transition time setting key 706 displayed on the setting item selection screen 700, the control unit 104 causes the touch panel unit 301 to display the screen illustrated in FIG. 8. If the user presses a plus key or a minus key displayed on the setting screen illustrated in FIG. 8, the control unit 104 increases/decreases a numerical value displayed on the selection screen. If the user presses an OK key, the control unit 104 sets the setting value into the "logout transition time" field 605 for the user in an active state.

As described above, the first exemplary embodiment can set the logout transition time for each user to improve usability of the apparatus. Furthermore, it can set a predetermined value for all users in a default state without setting the logout transition time.

Figure 10:
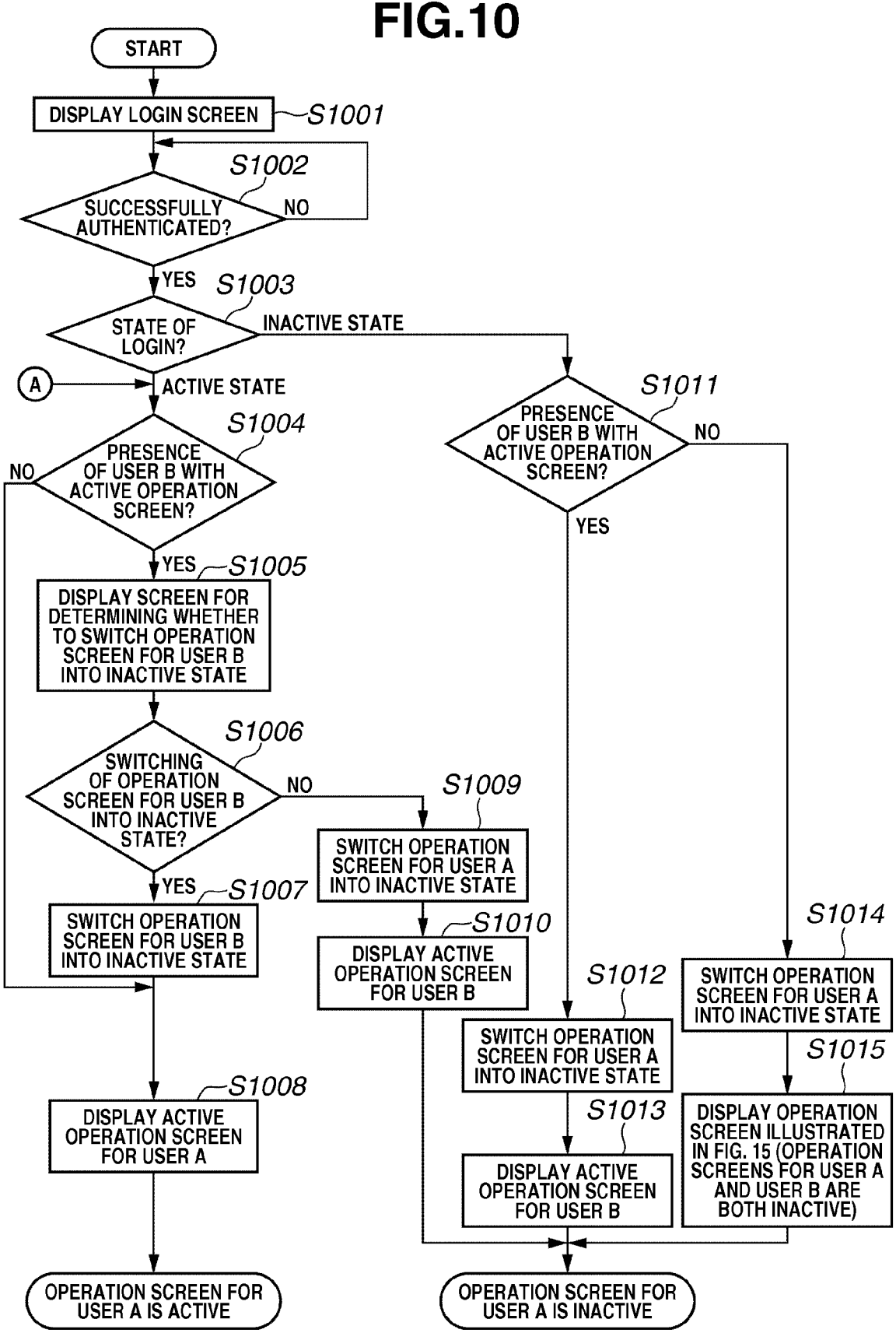
FIG. 10 is a flowchart illustrating an example control procedure according to an exemplary embodiment of the present invention.

Using the above-described system configuration together with the user management table 500 illustrated in FIG. 5 and the state transition management table 600 illustrated in FIG. 6, the control unit 104 performs control processing according to a flowchart illustrated in FIG. 10.

In the first exemplary embodiment, a user A logs in the image-processing apparatus 101. If the control unit 104 receives a login request from the user A, the control unit 104 starts control processing according to the flowchart illustrated in FIG. 10.

Figure 11:
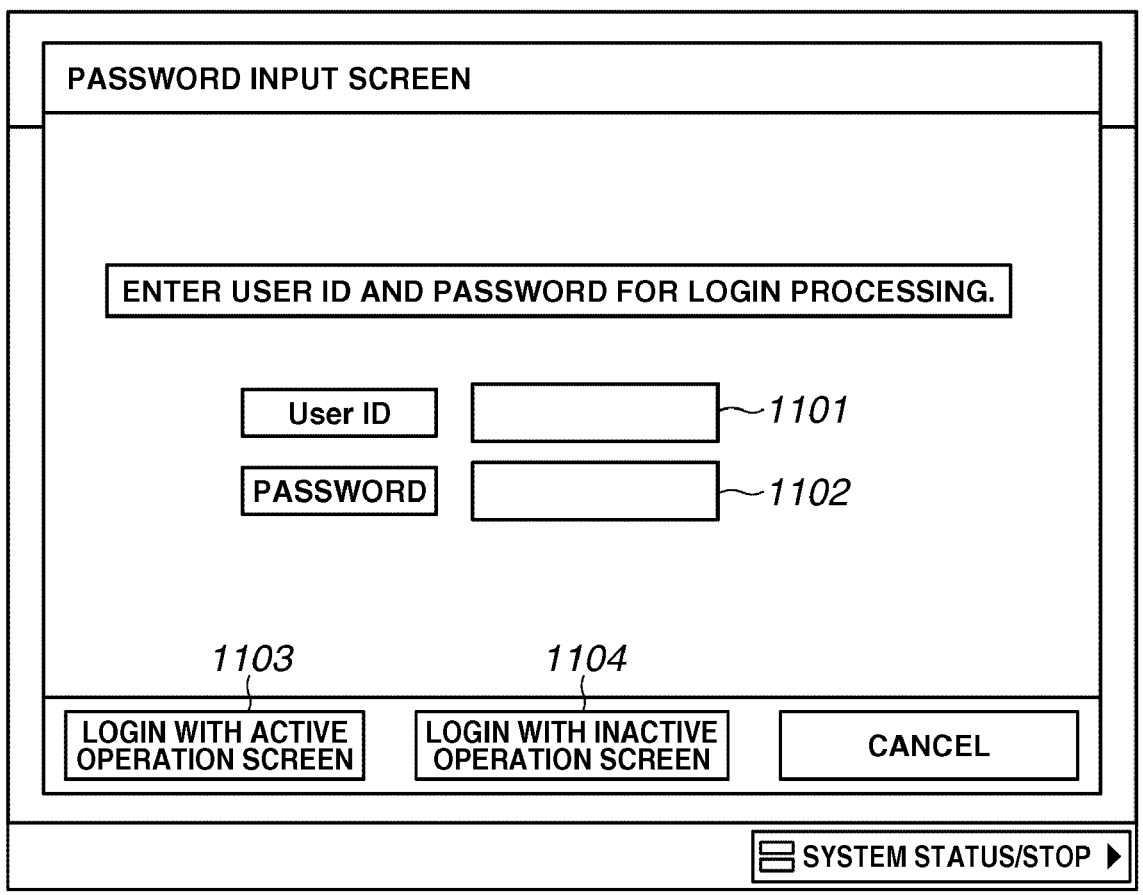
FIG. 11 illustrates an example display screen that the touch panel unit can display according to an exemplary embodiment of the present invention.

In step S1001, the control unit 104 causes the touch panel unit 301 to display a password input screen 1100 illustrated in FIG. 11 in response to the login request from the user A. That is, the control unit 104 determines whether the user A has pressed the ID key 310. If the control unit 104 determines that the user A has pressed the ID key 310, the control unit 104 causes the touch panel unit 301 to display the password input screen 1100 illustrated in FIG. 11.

In step S1002, if the user A enters a user ID in a user ID field 1101 and a password in a password field 1102 and presses an active key 1103 or an inactive key 1104 on the password input screen illustrated in FIG. 11, the control unit 104 performs user authentication based on the user ID and the password entered by the user A. More specifically, the control unit 104 determines whether the input user ID and the password correspond to any user ID and any password registered in the user management table 500 stored in the HDD 107.

If there is no corresponding data (NO in step S1002), the control unit 104 displays an authentication failure message on the password input screen and again receives a user ID and a password entered from the user. Then, the control unit 104 performs user authentication based on the newly entered user ID and the password. If the user A is successfully authenticated (YES in step S1002), the control unit 104 updates time data recorded in the "login time" field of the state transition management table 600. Then, the processing proceeds to step S1003.

In step S1003, the control unit 104 determines whether the user A has requested "login in an active state" or "login in an inactive state." For example, if in step S1002 the user A presses the active key 1103 on the password input screen 1100 illustrated in FIG. 11, the control unit 104 determines that the user A has requested an active login in step S1003 (ACTIVE STATE in step S1003) and the processing proceeds to step S1004. If in step S1002 the user A presses the inactive key 1104 on the password input screen 1100, the control unit 104 determines that the user A has requested an inactive login in step S1003 (INACTIVE STATE in step S1003) and the processing proceeds to step S1011.

If there is any other user whose operation screen is displayed in an active state, it is necessary to switch the operation screen of the other user into an inactive state before displaying an active operation screen for the user A.

Therefore, in step S1004, the control unit 104 determines whether there is any other user (hereinafter referred to as the user B) whose operation screen is displayed in an active state when the user A logs in. The control unit 104 refers to the "state" field 505 of the user management table 500 and if the control unit 104 determines that the user B (whose operation screen is displayed in an active state) is present (YES in step S1004), the processing proceeds to step S1005. If the control unit 104 determines that the user B is not present (NO in step S1004), the processing proceeds to step S1008.

Figure 12:
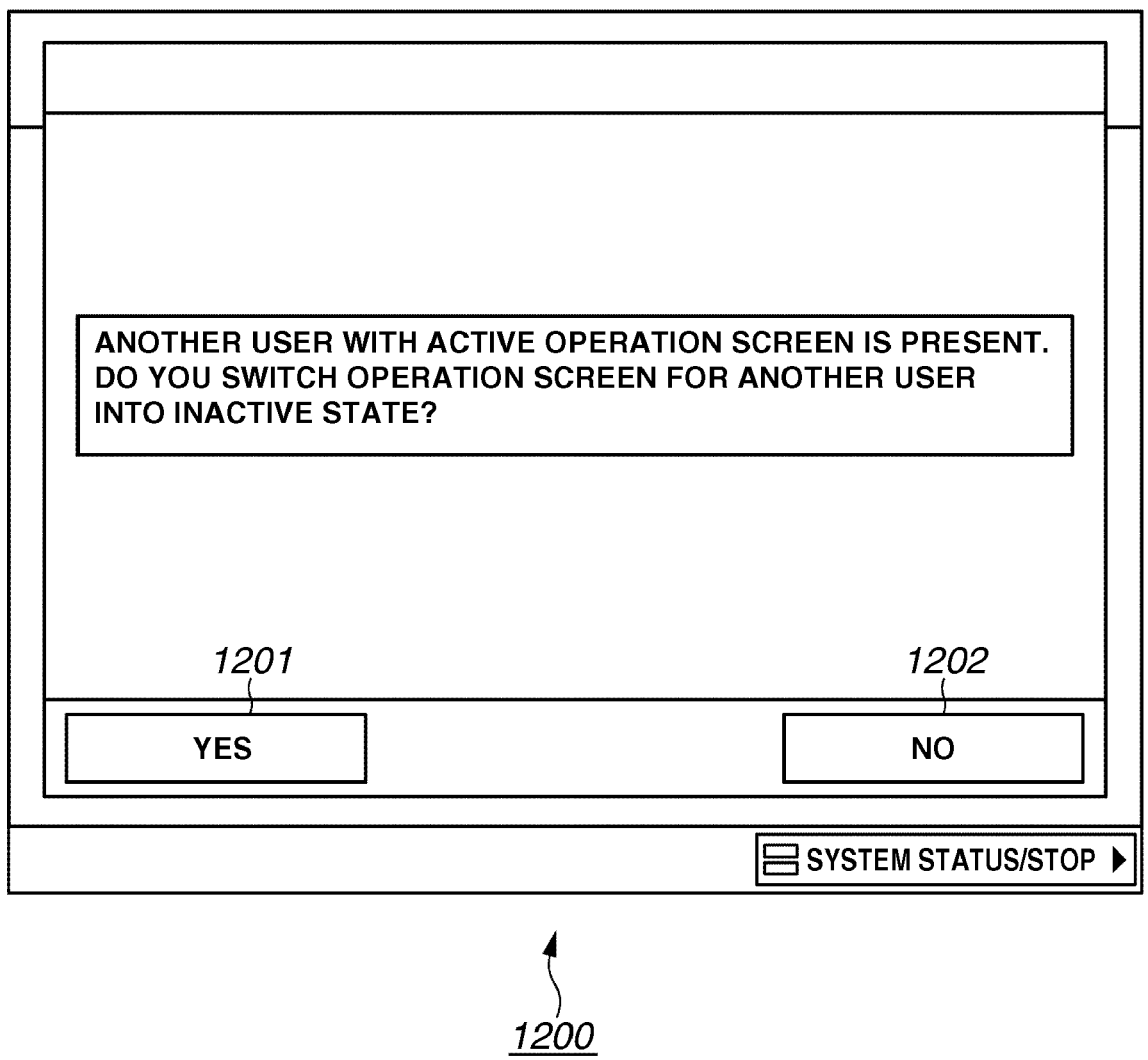
FIG. 12 illustrates an example display screen that the touch panel unit can display according to an exemplary embodiment of the present invention.

In step S1005, the control unit 104 causes the touch panel unit 301 to display a screen 1200 illustrated in FIG. 12 that enables the user A to switch the active operation screen of the user B into an inactive state. Then, the processing proceeds to step S1006.

In step S1006, the control unit 104 determines whether to switch the active operation screen of the user B to an inactive state. If the user A presses a YES key 1201 on the screen 1200 illustrated in FIG. 12, the control unit 104 determines that the user A has instructed to switch the operation screen of the user B to an inactive state (YES in step S1006), the processing proceeds to step S1007.

In step S1007, the control unit 104 switches the operation screen of the user B from the active state into the inactive state. More specifically, the control unit 104 rewrites a registered state in the "state" field 505 of the user management table 500 for the user B from "active state" to "inactive state". Then, the processing proceeds to step S1008.

Figure 16:
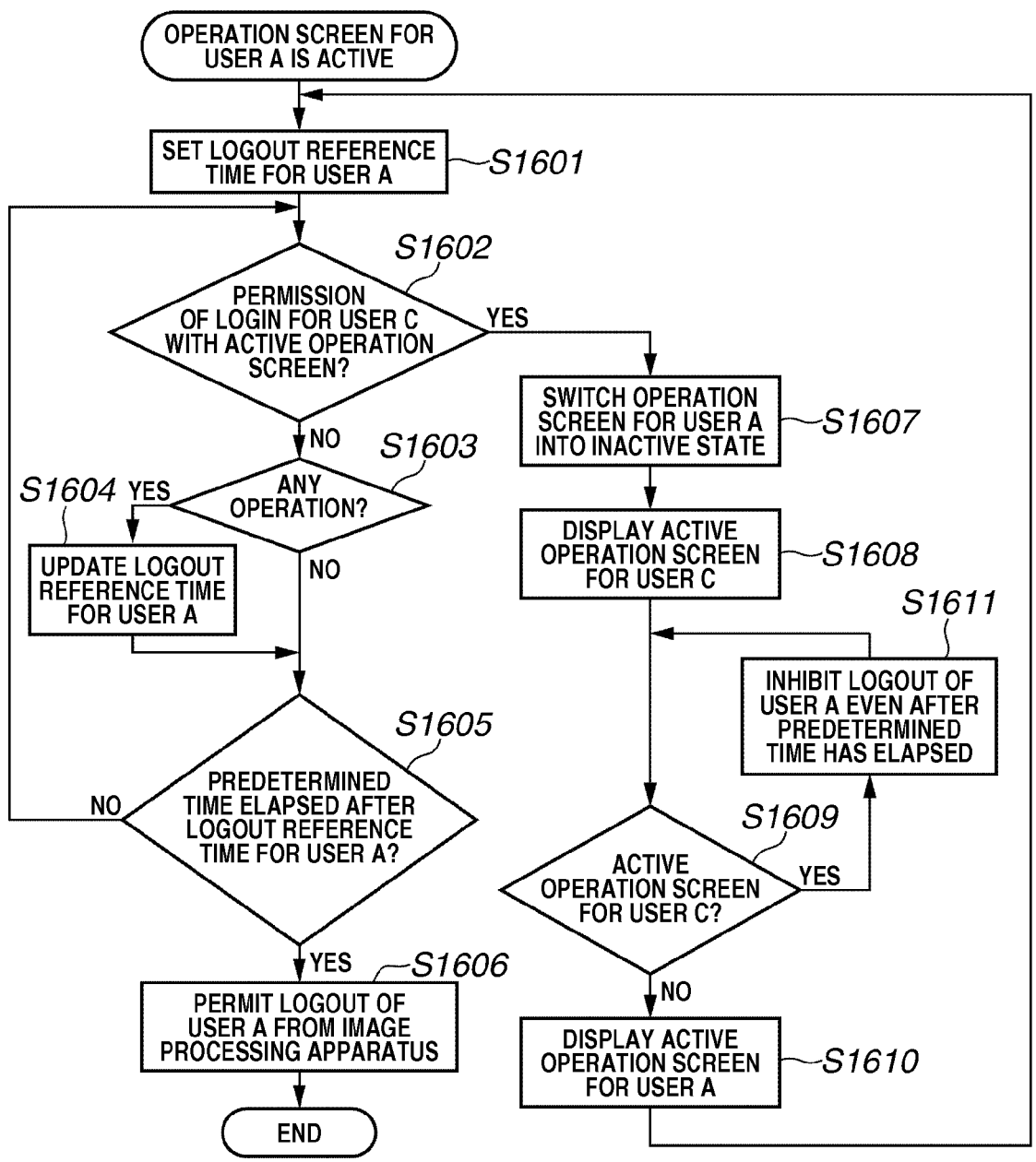
FIG. 16 is a flowchart illustrating an example control procedure according to an exemplary embodiment of the present invention.

In step S1008, the control unit 104 controls displaying of an active operation screen for the user A. For example, in the user management table 500 illustrated in FIG. 5, the control unit 104 rewrites the "login state" field 504 from "0" to "1" and the "state" field 505 to "active state" for the user A. Then, the control unit 104 causes the touch panel unit 301 to display the operation screen 1300 for the user A (illustrated in FIG. 13) and performs a control based on instruction input via the operation screen 1300. Then, the control unit 104 controls processing according to a flowchart illustrated in FIG. 16. The processing according to the flowchart illustrated in FIG. 16 is described later.

If the user A presses a NO key 1202 on the screen 1200 illustrated in FIG. 12 (NO in step S1006), the processing proceeds to step S1009. In step S1009, the control unit 104 performs setting for switching the operation screen for the user A into an inactive state. More specifically, the control unit 104 rewrites the "login state" field 504 from "0" to "1" in and the "state" field 505 to "inactive state" for the user A.

Figure 14:
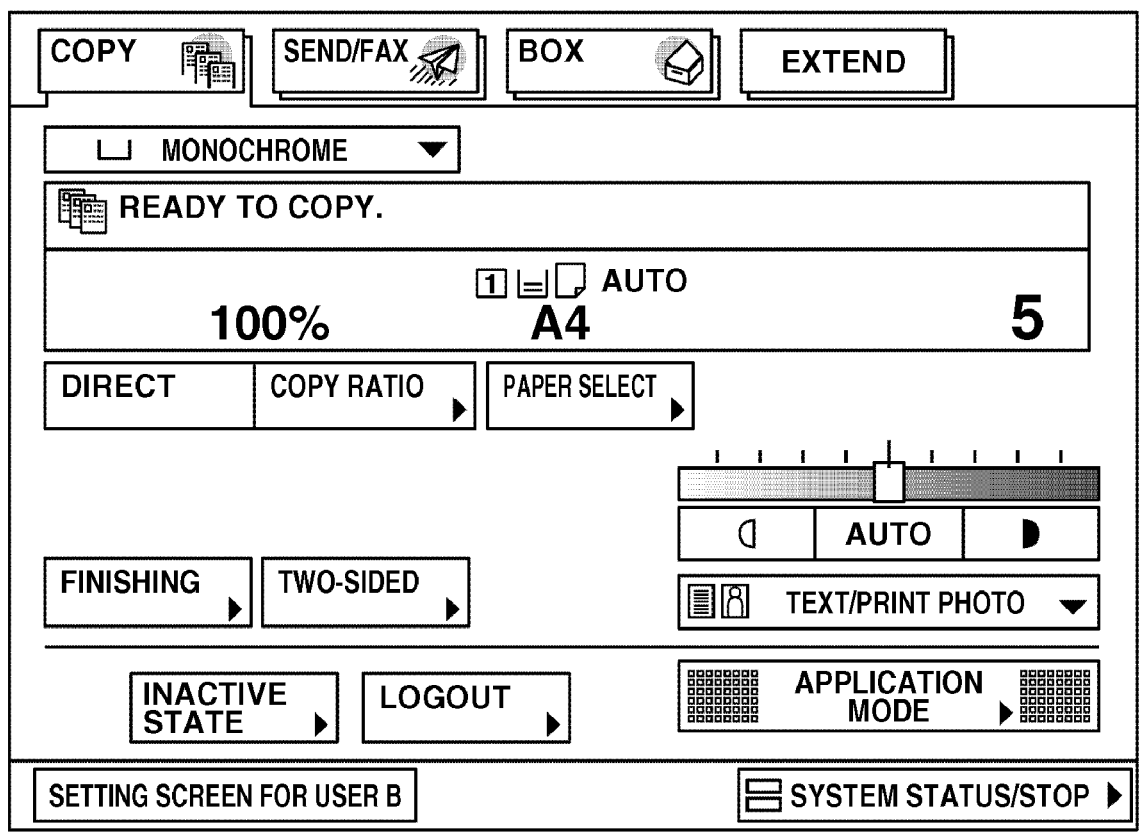
FIG. 14 illustrates an example display screen that the touch panel unit can display according to an exemplary embodiment of the present invention.
Figure 18:
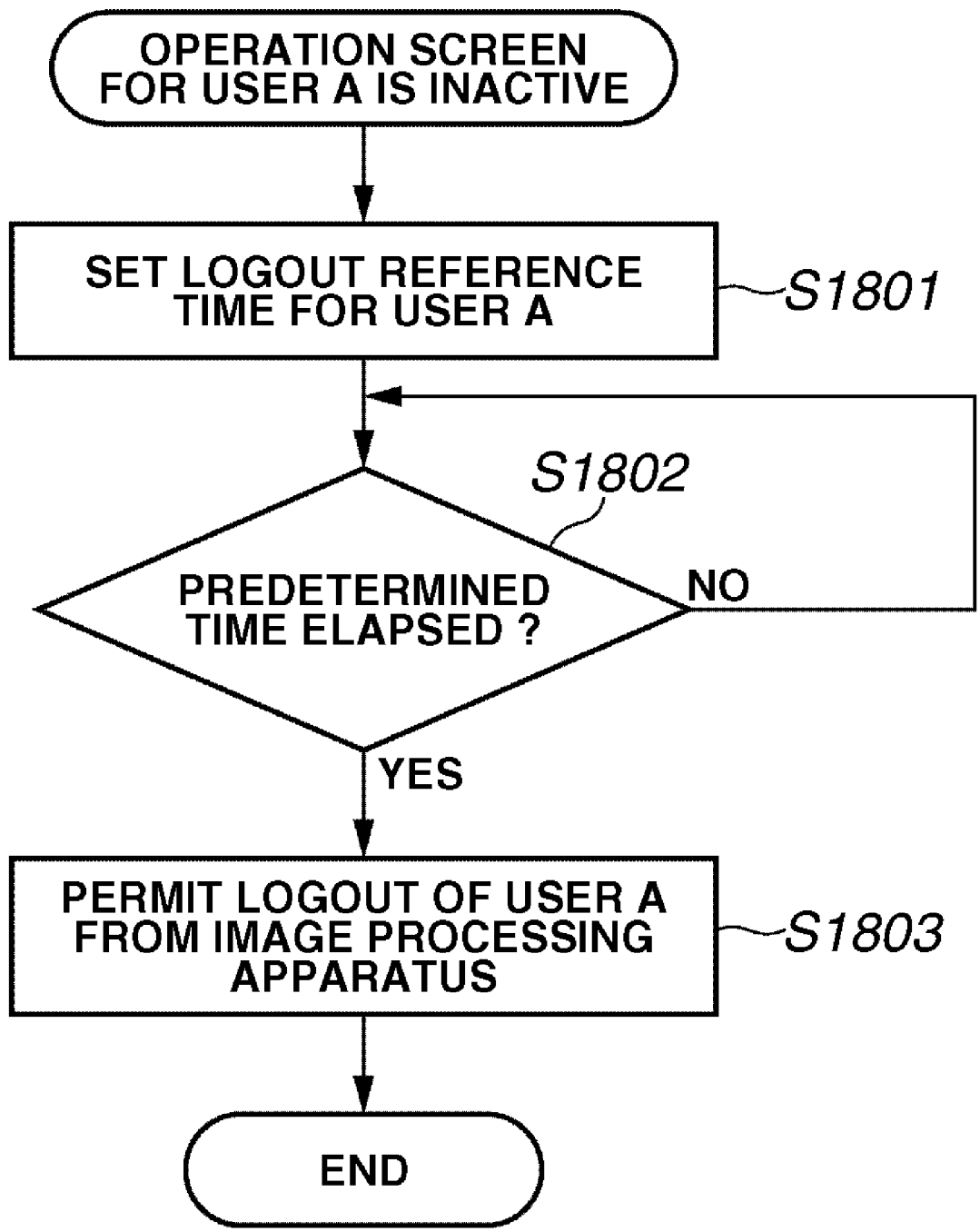
FIG. 18 is a flowchart illustrating an example control procedure according to an exemplary embodiment of the present invention.

Then, in step S1010, the control unit 104 causes the touch panel unit 301 to display an active operation screen 1400 for the user B as illustrated in FIG. 14. Then, the control unit 104 performs a control based on instruction input via the operation screen 1400. Furthermore, the control unit 104 controls processing according to a flowchart illustrated in FIG. 18. The processing according to the flowchart illustrated in FIG. 18 is described later.

If in step S1003 the control unit 104 determines that the user A presses the inactive key 1104 on the password input screen in step S1002, (INACTIVE STATE in step S1003) and the processing proceeds to step S1011. In step S1011, the control unit 104 determines whether there is any other user (user B) whose operation screen is displayed in an active state. If the control unit 104 determines that the user B (whose operation screen is displayed in an active state) is present (YES in step S1011), the processing proceeds to step S1012.

In step S1012, the control unit 104 switches the operation screen for the user A into an inactive state. In step S1013, the control unit 104 causes the touch panel unit 301 to display the active operation screen 1400 for the user B as illustrated in FIG. 14. Then, the control unit 104 performs a control based on instruction input via the operation screen 1400. Furthermore, the control unit 104 controls processing according to the flowchart illustrated in FIG. 18. The processing according to the flowchart illustrated in FIG. 18 is described later.

If the control unit 104 determines that the user B (whose operation screen is displayed in an active state) is not present (NO in step S1011), the processing proceeds to step S1014. In step S1014, the control unit 104 switches the operation screen for the user A into an inactive state. Then, in step S1015, the control unit 104 causes the touch panel unit 301 to display a user selection screen 1500 illustrated in FIG. 15. Then, the control unit 104 performs a control based on instruction input via the operation screen 1500.

That is, the user A selects a user name displayed in a user display field 1503 of the screen 1500 and presses an active state key 1501 or a logout key 1502 to switch the state of a selected user. If the active state key 1501 is pressed for a selected user, the control unit 104 switches the operation screen for the selected user from an inactive state to an active state. Furthermore, if the logout key 1502 is pressed for a selected user, the control unit 104 starts a logout procedure for the selected user. Moreover, the control unit 104 controls processing according to the flowchart illustrated in FIG. 18.

FIGS. 16 and 18 are flowcharts illustrating example control processing in which the control unit 104 transfer a state of a user who is in a login state.

FIG. 16 illustrates control processing that the control unit 104 performs for a user whose operation screen is displayed in an active state (hereinafter, referred to as "user A"). In step S1601, the control unit 104 sets a logout reference time for the user A with reference to time data recorded in the "logout reference time" field 604. If the logout reference time for the user A is already set, the control unit 104 updates the logout reference time.

Figure 13:
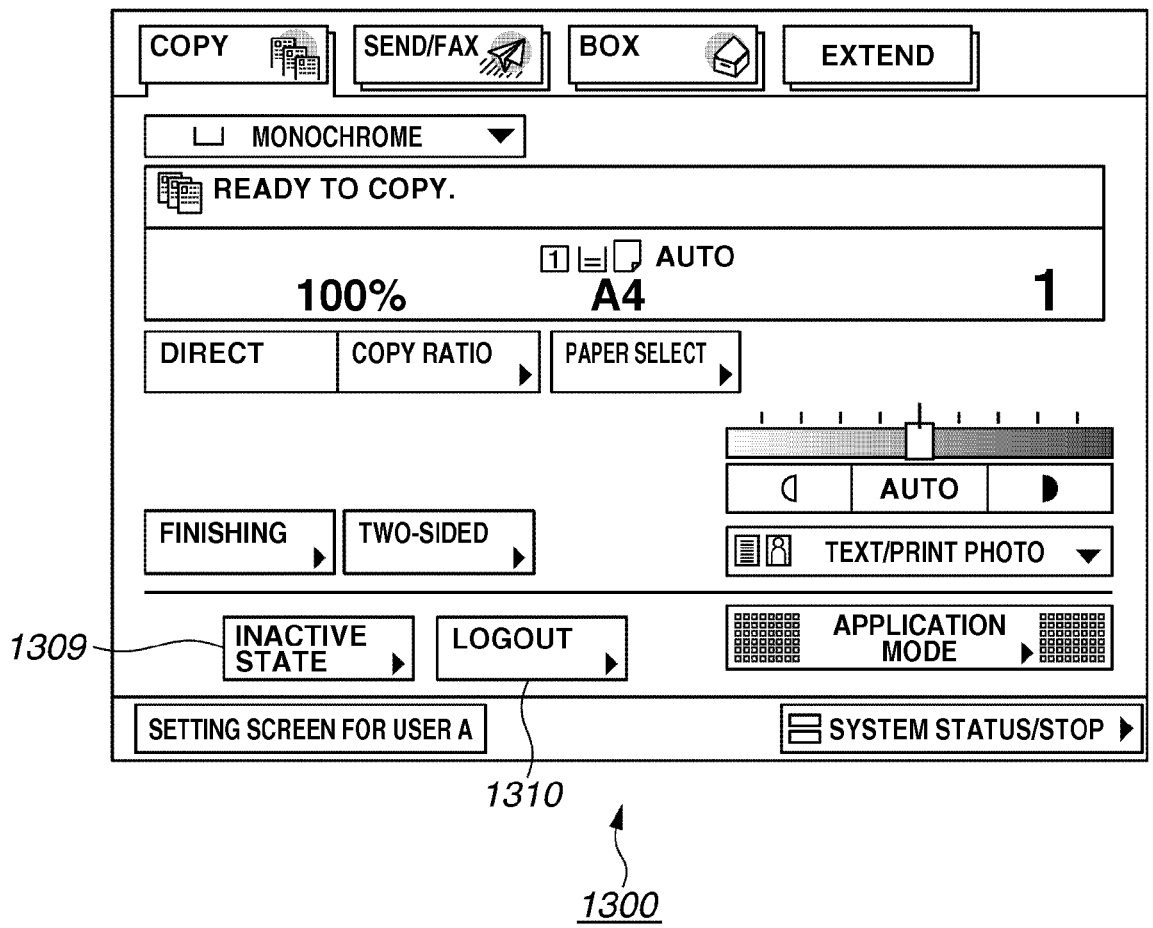
FIG. 13 illustrates an example display screen that the touch panel unit can display according to an exemplary embodiment of the present invention.

Then, when the operation screen for the user A is displayed in an active state, the control unit 104 causes the touch panel unit 301 to display the operation screen 1300 for the user A as illustrated in FIG. 13. The control unit 104 receives various settings (e.g., print setting, box function setting, etc) via the operation screen 1300. Furthermore, when the operation screen for the user A is displayed in an active state, the control unit 104 repeats processing in steps S1602 through S1605 in the flowchart illustrated in FIG. 16.

If the user A is in an active state and there is not any operation input via the operation unit 112 (NO in step S1603) until the logout transition time has elapsed after the logout reference time (YES in step S1605), the processing proceeds to step S1606. However, if the control unit 104 determines that any operation is received via the operation unit 112 before the logout transition time has elapsed (YES in step S1603), the processing proceeds to step S1604. In step S1604, the control unit 104 updates the logout reference time for a user registered in the state transition management table 600 illustrated in FIG. 6. Then, the processing proceeds to step S1605.

It is now assumed that another user (user C) presses the ID key 310 during the above-described processing in steps S1602 through S1605 and the control unit 104 allows the user C to log in with an active state by executing steps S1001 through S1008 illustrated in FIG. 10. In this case, the processing proceeds from step S1602 to step S1607. In step S1607, the control unit 104 switches the operation screen for the user A (which is currently displayed in an active state) into an inactive state.

Figure 17:
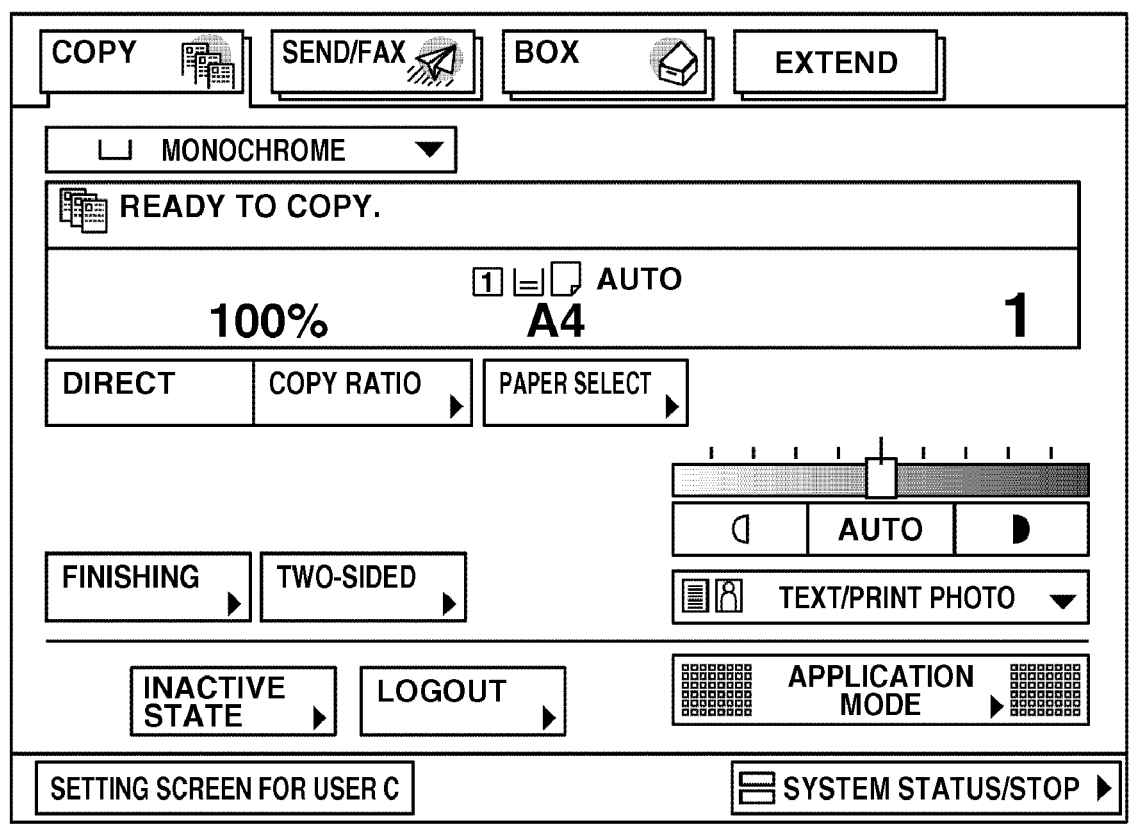
FIG. 17 illustrates an example display screen that the touch panel unit can display according to an exemplary embodiment of the present invention.

In step S1608, the control unit 104 causes the touch panel unit 301 to display an active operation screen 1700 for the user C as illustrated in FIG. 17.

Then, if the control unit 104 determines that the operation screen for the user C is displayed in the active state (YES in step S1609), the control unit 104 maintains the inactive state of the user A. As illustrated in step S1611, if the operation screen for the user C is displayed in the active state, the control unit 104 inhibits the user A from logging out even if the logout transition time set for the user A has elapsed after the logout reference time in the idle state.

Therefore, if the other user (user C) cuts in an operation of the user A who operates the image-processing apparatus 101 via the operation screen displayed in the active state, the first exemplary embodiment can prevent the user A from being forcibly logged out.

If the control unit 104 determines that the operation screen for the user C is inactive (NO in step S1609), the processing proceeds to step S1610. In step S1610, the control unit 104 causes the touch panel unit 301 to display the operation screen for the user A in an active state. Then, the processing returns to step S1601 to reset the logout reference time.

As described above, if the operation screen for the user C is active, the control unit 104 inhibits a logout procedure of the user A whose operation screen is in the inactive state and extends the logout transition time set for the user A. Furthermore, during the processing in steps S1602 through S1605, if the control unit 104 does not receive any operation input via the operation unit 112 until the time recorded in "logout transition time" field 606 has elapsed, the processing proceeds to step S1606. In step S1606, the control unit 104 permits the user A to log out of the image-processing apparatus 101. In this case, the control unit 104 causes the touch panel unit 301 to display the screen 1500 illustrated in FIG. 15.

Figure 15:
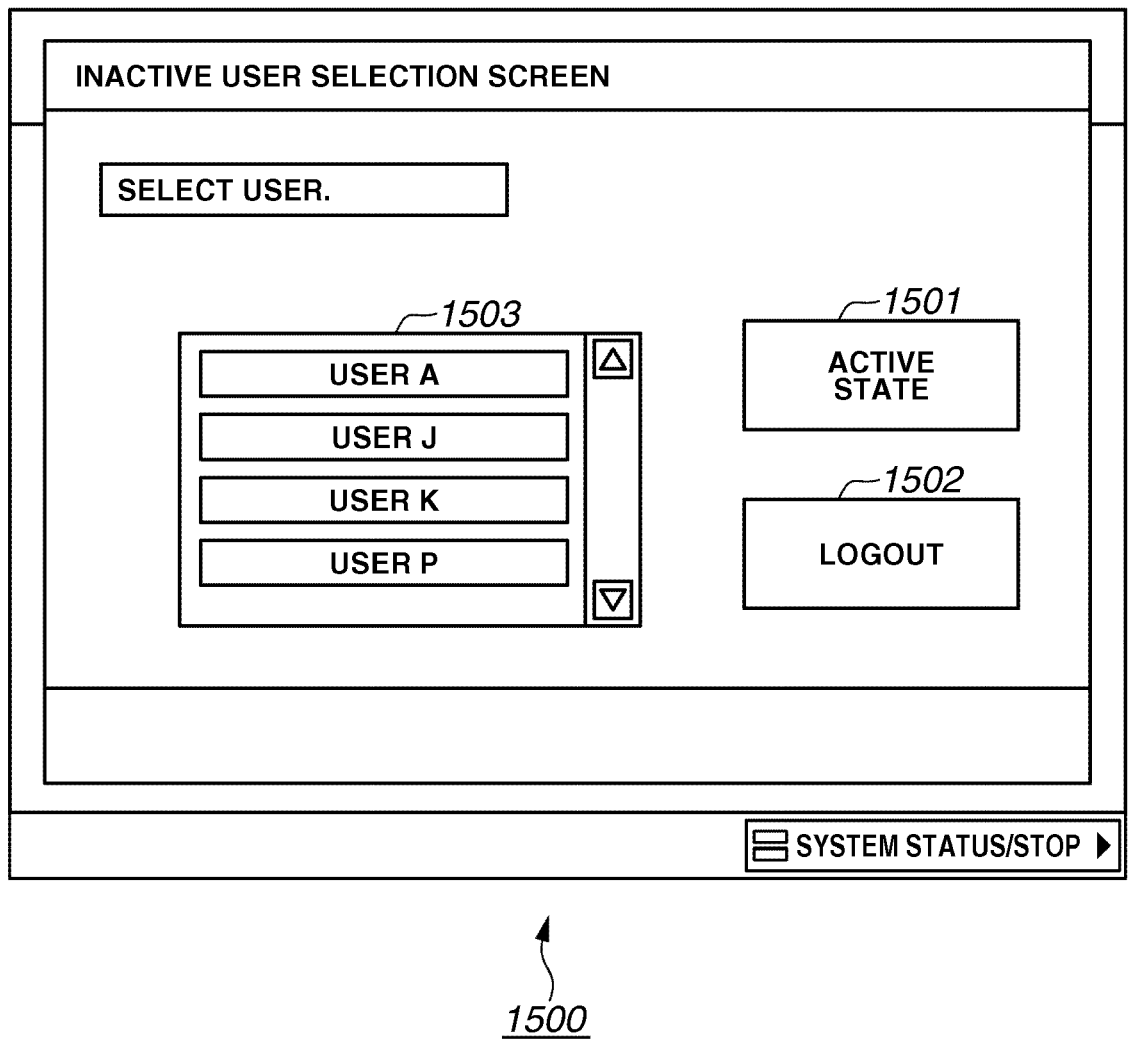
FIG. 15 illustrates an example display screen that the touch panel unit can display according to an exemplary embodiment of the present invention.

If the user A presses an inactive state key 1309 on the operation screen 1300 illustrated in FIG. 13 before the control unit 104 completes the processing illustrated in FIG. 16, the control unit 104 causes the touch panel unit 301 to switch the operation screen for the user A into an inactive state and display the screen 1500 illustrated in FIG. 15.

Furthermore, the control unit 104 performs the processing for the user A according to the flowchart illustrated in FIG. 18. On the other hand, if the user A presses a logout key 1310 on the operation screen 1300 illustrated in FIG. 13 before the control unit 104 completes the processing illustrated in FIG. 16, the control unit 104 displays the screen 1500 illustrated in FIG. 15 and performs processing for permitting the user A to log out of the image-processing apparatus 101.

Furthermore, if the operation screen for the user C is displayed in the active state, the control unit 104 allows the other user (user D) to log in the image-processing apparatus 101 with an active operation screen.

In this case, the control unit 104 causes the touch panel unit 301 to switch the operation screen for the user C from the active state into the inactive state and display an active operation screen for the user D. Then, if the operation screen for the user D is displayed in the active state, the control unit 104 prevents the user C from being logged out of the image-processing apparatus 101 even after the logout transition time set for the user C has elapsed.

Similarly, if the operation screen for the user D is in the active state, the control unit 104 prevents the user A from being logged out of the image-processing apparatus 101 even after the logout transition time set for the user A has elapsed. Then, if the operation screen for the user D becomes inactive, the control unit 104 displays the active operation screen for the user C. In this case, if the operation screen for the user C is displayed in the active state, the control unit 104 prevents the user A from being logged out of the image-processing apparatus 101 even after the logout transition time set for the user A has elapsed.

As described above, if the other user (user C) presses the ID key 310 in a state where there is the user (user A) whose operation screen is displayed in the active state, the control unit 104 performs the following control to permit a login procedure of the user C. The control unit 104 inhibits the user A from logging out of the image-processing apparatus 101 after the predetermined time has elapsed. Thus, the first exemplary embodiment can prevent a user from being forcibly logged out of the image-processing apparatus 101 in a case where the user allows another user to temporarily operate the image-processing apparatus 101.

FIG. 18 is a flowchart illustrating an example control procedure that the control unit 104 performs for a user (user A) in an inactive state.

In step S1801, the control unit 104 sets a logout reference time for the user A. In step S1802, the control unit 104 determines whether the logout transition time set for the user A has elapsed after the logout reference time set for the user A. If the control unit 104 determines that the logout transition time has not elapsed (NO in step S1802), the control unit 104 repeats the processing in step S1802. If the control unit 104 determines that the logout transition time set for the user A has elapsed (YES in step S1802), the processing proceeds to step S1803. In step S1803, the control unit 104 permits the user A to log out of the image-processing apparatus 101. Then, the control unit 104 terminates the processing of this routine.

The screen 1500 illustrated in FIG. 15 enables a user to select a user whose operation screen is to be switched into an active state and press the active state key 1501. In this case, the control unit 104 causes the touch panel unit 301 to display an active operation screen for a selected user.

As described above, the first exemplary embodiment basically causes a user, if the operation screen is in an inactive state, to log out of the image-processing apparatus 101 after the logout transition time has elapsed to enhance security and does not cause the user from logging out of the image-processing apparatus 101 according to an operation of the apparatus to improve usability of the apparatus 101.

Second Exemplary Embodiment

According to the first exemplary embodiment, if the user A allows the user C to operate the image-processing apparatus 101 and the operation screen for the user A is switched into an inactive state, the control unit 104 does not permit a logout procedure for the user A when an active operation screen is displayed for the user C. In this state, i.e., when the operation screen for the user C is active, the control unit 104 accepts a login request from another user (user D) who wants to log in the image-processing apparatus 101 in an active state.

According to the first exemplary embodiment, if the user D logs in the image-processing apparatus 101 in an active state, the control unit 104 causes the touch panel unit 301 to switch the operation screen for the user C from the active state into the inactive state and display an active operation screen for the user D. Then, if the operation screen for the user D is in the active state, the control unit 104 does not permit the user C and the user A to log out of the image-processing apparatus 101 even after the logout transition time has elapsed. Namely, if the user D is in the active state, the control unit 104 inhibits the user A and the user C from logging out of the image-processing apparatus 101 and maintains the user A and the user C in the inactive state.

However, the above-described method does not limit a number of control objects (namely users in the inactive state) which cannot be automatically logged out after the logout transition time has elapsed. Therefore, an increase in the number of control objects may decrease the resource of the HDD 107 and the processing speed of the control unit 104. Hence, the second exemplary embodiment limits the number of users who are in an inactive state and not allowed to perform logout processing.

The second exemplary embodiment is different from the first exemplary embodiment in the processing performed in step S1611. More specifically, in step S1611, the control unit 104 according to the second exemplary embodiment determines whether there are a great number of users who are designated as a control object which cannot be automatically logged out when a predetermined logout transition time has elapsed. If a number of users exceeds the predetermined number, the control unit 104 performs the following processing.

The control unit 104 allows an oldest user who has been brought into an inactive state to log out of the image-processing apparatus 101. Thus, the second exemplary embodiment of the present invention can prevent the number of users in an inactive state (i.e., users cannot be automatically logged out when a predetermined logout transition time has elapsed) from increasing excessively. Thus, according to the second exemplary embodiment, the HDD 107 can hold a sufficient resource and the control unit 104 can operate at a higher processing speed.

Third Exemplary Embodiment

According to the above-described exemplary embodiments, if a user whose operation screen is in an active state allows another user to cut in for operating the image-processing apparatus 101, the control unit switches the active operation screen of the user into an inactive state and does not permit a logout procedure of the user even after a predetermined time has elapsed.

Figure 19:
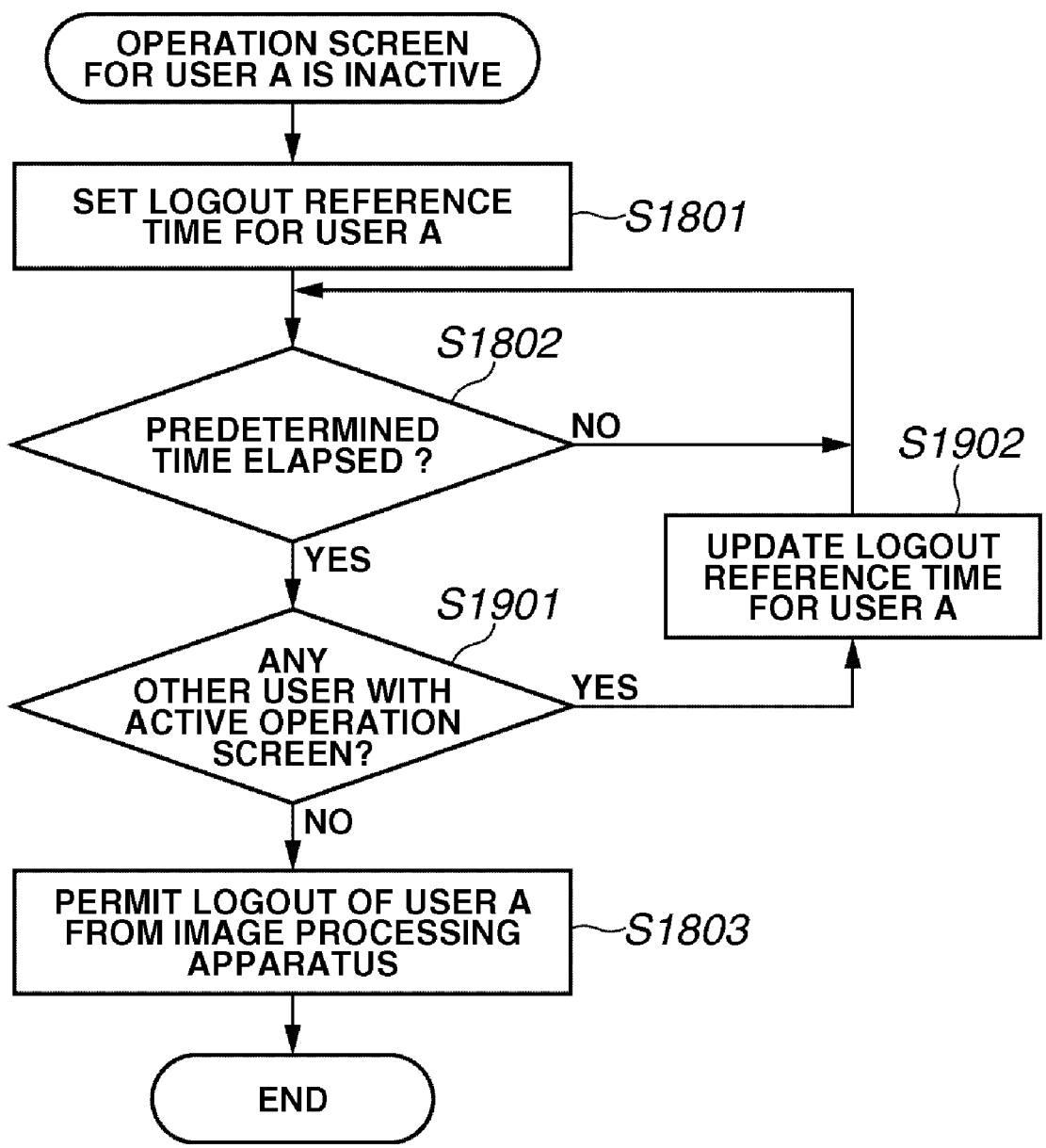
FIG. 19 is a flowchart illustrating an example control procedure according to an exemplary embodiment of the present invention.

However, the third exemplary embodiment performs the following control. If there is not any user whose operation screen is displayed in an active state, the control unit 104 permits a user whose operation screen is in an inactive state to log out of the image-processing apparatus 101 after a predetermined logout transition time has elapsed. However, if there is a user whose operation screen is displayed in an active state, the control unit 104 does not start a logout procedure for any user whose operation screen is in an inactive state after the logout transition time has elapsed. FIG. 19 is a flowchart illustrating an example control procedure according to the third exemplary embodiment of the present invention.

In step S1801, the control unit 104 sets a logout reference time for a user A. In step S1802, the control unit 104 determines whether the logout transition time has elapsed after the logout reference time. If the control unit 104 determines that the logout transition time has not elapsed (NO in step S1802), the control unit 104 repeats the processing in step S1802. If the control unit 104 determines that the logout transition time has elapsed (YES in step S1802), the processing proceeds to step S1901.

In step S1901, the control unit 104 determines whether any user whose operation screen is displayed in an active state is present. If the control unit 104 determines that there is a user whose operation screen is displayed in an active state (YES in step S1901), the processing proceeds to step S1902. In step S1902, the control unit 104 updates the logout reference time set for the user A. Then, the processing returns to step S1802.

As described above, if there is any user whose operation screen is displayed in an active state, the control unit 104 prevents the user whose operation screen is in an inactive, from being logged out of the image-processing apparatus 101 even after the logout transition time has elapsed. Thus, even if a user operates the image-processing apparatus 101 for a long time in a state where the operation screen for this user is displayed in an active state, the third exemplary embodiment can prevent a user whose operation screen is in an inactive state, from being forcibly logged out of the image-processing apparatus 101.

As described above, to enhance security, the third exemplary embodiment permits a user whose operation screen is in an inactive state to log out of the image-processing apparatus 101 after a logout transition time has elapsed. Furthermore, to improve usability of the apparatus, the third exemplary embodiment can inhibit a logout procedure according to an operating status of the apparatus.

Other Exemplary Embodiment

According to the above-described exemplary embodiments, the display unit 301 fully displays an operation screen in an active state and does not display an operation screen in an inactive state. The active state and the inactive state can be defined in the following manner.

Figure 9:
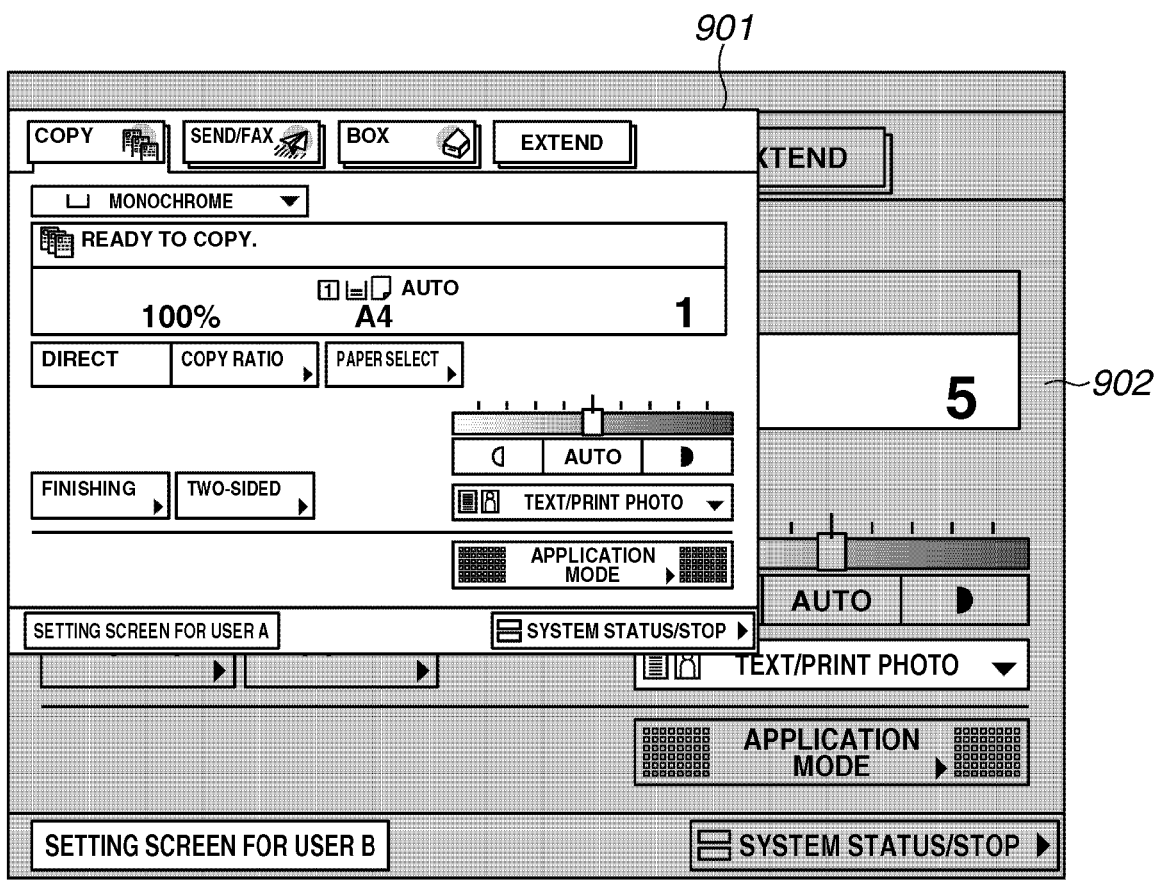
FIG. 9 illustrates an example display screen that the touch panel unit can display according to an exemplary embodiment of the present invention.

FIG. 9 illustrates an example operation screen 901 for a user and another operation screen 902 for another user. The operation screen 901, which is highlighted, enables a user to perform job settings and instruct a job execution and therefore can be referred to as an operation screen in an active state. The operation screen 902, which is partly displayed and not highlighted on the display unit 301, does not enable a user to perform job settings and instruct a job execution and therefore can be referred to as an operation screen in an inactive state. The user whose operation screen is in an inactive state can instruct the system to switch the operation screen to an active state and then can perform job settings and instruct a job execution via the operation screen switched into an active state. Even in a case where the active state and the inactive state are defined as described above, the system can perform controls similar to those described in the first to third exemplary embodiments.

Furthermore, according to the above-described exemplary embodiments, if a user presses the ID key 310 to log in the image-processing apparatus 101, the display unit 301 displays the screen illustrated in FIG. 11 which enables the user to enter a user ID and a password. However, the method for logging in the image-processing apparatus 101 is not limited to the above-described example. For example, if the image-processing apparatus 101 includes a device port that can communicate with an IC card, a user can insert an authorized ID card into the device port to log in. In this case, the control unit 104 of the image-processing apparatus 101 reads a user ID and a password stored in the inserted ID card. If the user is successfully authenticated, the control unit 104 permits the user to log in the image-processing apparatus 101.

According to this login method, if another user requests to log in via an ID card in a state where an active operation screen is displayed for the user who currently logs in, the system permits the other user to log in the image-processing apparatus 101 in an inactive state while maintaining the operation screen for the user in the active state. This method enables the other user to smoothly log in the image-processing apparatus 101 without causing any interference with the user who currently operates the system via the active operation screen. The ID card to communicate with the image-processing apparatus 101 is not limited to a wired type and may be a wireless type.

In the image-processing apparatus 101 of the above-described exemplary embodiments, the control unit 104 causes the touch panel unit 301 to display a screen. However, the touch panel unit 301 can include a dedicated control unit and a display memory. In this case, the control unit 104 can send display data to the display memory of the touch panel unit. The control unit of the touch panel unit can control the display based on the display data stored in the display memory.

An information-processing apparatus described in the present exemplary embodiment of the present invention is an image-processing apparatus that can execute a job including image data. The information-processing apparatus is capable of maintaining a login state of each user when the information-processing apparatus is operated by a plurality of users. Furthermore, the information-processing apparatus is configured to cause a display unit to switch an operation screen for a user who currently logs in the information-processing apparatus between an active state where the user can operate the operation screen and an inactive state where the user cannot operate the operation screen.

For example, the information-processing apparatus includes the control unit 104 that automatically starts a logout procedure for the user who currently logs in the information-processing apparatus after a predetermined idle time has elapsed. Furthermore, if the display unit displays an active operation screen for a first user and displays an inactive operation screen for a second user, the control unit 104 performs the following control processing. The control unit 104 prevents the second user whose operation screen is in an inactive state, from being automatically logged out of the information-processing apparatus after the predetermined idle time has elapsed.

In this manner, the information-processing apparatus according to the present exemplary embodiment can execute the above-described example control processing. Furthermore, if an instruction is input to switch the operation screen for the second user from the inactive state to the active state when the display unit displays the active operation screen for the first user, the control unit 104 performs the following control processing. The control unit 104 switches the operation screen for the second user from the inactive state into the active state and switches the operation screen for the first user from the active state into the inactive state.

In this manner, the information-processing apparatus according to the present exemplary embodiment can execute the above-described example control processing. Furthermore, if the operation screen for the first user is displayed in the active state, the control unit 104 causes the display unit to deactivate operation screens of other users. In this manner, the information-processing apparatus according to the present exemplary embodiment can execute the above-described example control processing.

Furthermore, if a number of users designated as a control object which cannot be automatically logged out of the information-processing apparatus after a predetermined time has elapsed, exceeds a predetermined number, the control unit 104 permits any one of these users to log out of the information-processing apparatus. In this manner, the information-processing apparatus according to the present exemplary embodiment can execute the above-described example control processing.

The information-processing apparatus according to the above-described exemplary embodiments can bring out the following effects. For example, switching the state of a user according to an operating status of the apparatus can enhance security and improve usability of the apparatus.

The information-processing system (e.g., printing system) according to the above-described exemplary embodiments has been described as a system including an information-processing apparatus (i.e., image-processing apparatus 101) and other apparatus (i.e., client computer 103 and/or server computer 102). However, the information-processing system (e.g., printing system) according to the exemplary embodiments can include only an information-processing apparatus (i.e., image-processing apparatus 101).

According to the above-described exemplary embodiments, authentication information for each user is stored in the HDD 107 of the image-processing apparatus 101. However, the server computer 102 or the client computer 103 can store history information.

An example configuration of data processing programs readable by an image-processing apparatus according to the present invention is described with reference to a memory map illustrated in FIG. 20.

FIG. 20 illustrates a memory map of a storage medium capable of storing various data processing programs that an image-processing apparatus according to the exemplary embodiments of the present invention can read. Although not shown in the drawing, the storage medium can store management information for the programs stored in the storage medium, such as version information and creator names, and information relevant to the OS that reads the programs, e.g., icons discriminately displaying the programs.

Furthermore, a directory of the storage medium can manage data belonging to various programs. Moreover, the storage medium can store a program for installing various programs on a computer and a decompression program if the installed program is compressed.

A host computer can execute the control procedure illustrated in FIGS. 10, 16, and 18 according to programs installed from an external device. In this case, an information group including programs can be supplied to an output apparatus via a storage medium (e.g., compact disk-ROM (CD-ROM), flash memory, or floppy disk (FD)), or from an external storage medium via a network, to realize the present invention.

Furthermore, a computer readable storage medium which stores software program code for realizing the functions of the above-described exemplary embodiments can be supplied to a system or an apparatus including various devices. A computer (or central processing unit (CPU) or micro-processing unit (MPU)) in the system or the apparatus can execute the program stored in the storage medium to operate the devices to implement the present invention.

In this case, the program code itself can realize the functions of the exemplary embodiments of the present invention. Equivalents of programs can be used if they possess comparable functions. In this case, the equivalents of program can be any one of object code, interpreter program, and OS script data.

Furthermore, the present invention encompasses supplying program code to a computer with a storage medium storing the program code. The storage medium supplying the program can be selected from any one of a floppy disk, a hard disk, an optical disk, a magneto-optical (MO) disk, a CD-ROM, a CD-recordable (CD-R), a CD-rewritable (CD-RW), a magnetic tape, a nonvolatile memory card, a ROM, and a DVD.

The method for supplying the program includes accessing a web site on the Internet using the browsing function of the client computer 103, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses World Wide Web (WWW) servers and file transfer protocol (ftp) servers that allow numerous users to download the program files so that the functions or processes of the present invention can be realized on their computers.

Enciphering the programs of the present invention and storing the enciphered programs on a CD-ROM or comparable recording medium is an exemplary method to distribute the program to the users. The authorized users (i.e., users satisfying predetermined conditions) are allowed to download key information from a web site on the Internet. The users can decipher the programs with the obtained key information and can install the programs on their computers. When the computer reads and executes the installed programs, the functions of the above-described exemplary embodiments can be realized.

Moreover, an operating system (OS) or other application software running on a computer can execute part or the whole of actual processing based on instructions of the programs.

Additionally, the program code read out from a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-103854 filed Apr. 11, 2007, which is hereby incorporated by reference herein in its entirety.

What is claimed is:

1. An information-processing apparatus capable of maintaining a state in which a plurality of users has been logged in to the information-processing apparatus, comprising:
    a display control unit configured to cause a display unit to switch an operation screen for a user who is currently logged in to the information-processing apparatus between an active state where the user can operate the operation screen and an inactive state where the user cannot operate the operation screen; and
    a control unit configured to automatically log out a user who is currently logged in to the information-processing apparatus in a case where an operation screen for the user is in the inactive state when a predetermined idle time has elapsed, wherein the control unit controls, in a case where an operation screen for a first user is switched to the inactive state in accordance with switching an operation screen for a second user to the active state, so as not to automatically log out the first user, even if an operation screen for the first user is in the inactive state when the predetermined idle time has elapsed.

2. The information-processing apparatus according to claim 1, wherein in a case where an instruction is input to switch the operation screen for one user to the active state when the display unit displays the operation screen for another user in the active state, the display control unit is adapted to switch the operation screen for one user from the inactive state to the active state and switch the operation screen for the another user from the active state to the inactive state.

3. The information-processing apparatus according to claim 1, wherein in a case where the display unit displays the operation screen for one user in the active state, the display control unit is adapted to cause the display unit not to display an operation screen for another user.

4. The information-processing apparatus according to claim 1, wherein in a case where a number of users who are controlled so as not to be automatically logged out of the information-processing apparatus when the predetermined idle time has elapsed exceeds a predetermined number of users, the control unit is adapted to log out one of the users of the information-processing apparatus.

5. The information-processing apparatus according to claim 4, wherein in a case where a number of users, who are controlled so as not to be automatically logged out of the information-processing apparatus when the predetermined idle time has elapsed, exceeds a predetermined number of users, the control unit is adapted to log out one of the users of the information-processing apparatus whose operation screen is switched to the inactive state at the earliest time.

6. A method for controlling an information-processing apparatus capable of maintaining a state in which a plurality of users have been logged in to the information-processing apparatus, the method comprising:
    causing a display unit to switch an operation screen for a user who is currently logged in to the information-processing apparatus between an active state where the user can operate the operation screen and an inactive state where the user cannot operate the operation screen;
    automatically logging out a user who is currently logged in to the information-processing apparatus in a case where an operation screen for the user is in the inactive state when a predetermined idle time has elapsed; and
    controlling, in a case where an operation screen for a first user is switched to the inactive state in accordance with switching an operation screen for a second user to the active state, so as not to automatically log out the first user, even if an operation screen for the first user is in the inactive state when the predetermined idle time has elapsed.

7. A non-transitory computer readable storage medium storing a program adapted to cause an information-processing apparatus to perform a method comprising:
    causing a display unit to switch an operation screen for a user who is currently logged in to the information-processing apparatus between an active state where the user can operate the operation screen and an inactive state where the user cannot operate the operation screen;
    automatically logging out a user who is currently logged in to the information-processing apparatus in a case where an operation screen for the user is in the inactive state when a predetermined idle time has elapsed; and
    controlling, in a case where an operation screen for a first user is switched to the inactive state in accordance with switching an operation screen for a second user to the active state, so as not to automatically log out the first user, even if an operation screen for the first user is in the inactive state when the predetermined idle time has elapsed.

* * * * *